US007724906B2

(12) United States Patent
Matsushita

(10) Patent No.: US 7,724,906 B2
(45) Date of Patent: May 25, 2010

(54) DECRYPTION APPARATUS AND DECRYPTION METHOD

(75) Inventor: Tatsuyuki Matsushita, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1148 days.

(21) Appl. No.: 11/219,768

(22) Filed: Sep. 7, 2005

(65) Prior Publication Data

US 2006/0204008 A1    Sep. 14, 2006

(30) Foreign Application Priority Data

Mar. 8, 2005    (JP) ............... 2005-064219

(51) Int. Cl.
*H04L 9/00*    (2006.01)
(52) U.S. Cl. .................. 380/277; 380/278; 713/163
(58) Field of Classification Search .............. 380/255
See application file for complete search history.

(56) References Cited

U.S. PATENT DOCUMENTS

| 7,401,231 | B2* | 7/2008 | Taki et al. .............. 713/193 |
| 2002/0147906 | A1 | 10/2002 | Lotspiech et al. | |
| 2005/0210014 | A1* | 9/2005 | Asano .............. 707/3 |

OTHER PUBLICATIONS

Dalit Naor, et al., "Revocation and Tracing Schemes for Stateless Receivers", Process of CRYPTO 2001, LNCS 2139, 2001, pp. 41-62.

Dalit Naor†, et al., "Revocation and Tracing Schemes for Stateless Receivers*", Cryptology ePrint Archive, The Internatinoal Association for Cryptologic Research (IACR), Report 2001/059, URL, http://eprint.iacr.org/2001/059, Dec. 5, 2001, 36 Pages.

* cited by examiner

*Primary Examiner*—Gilberto Barron, Jr.
*Assistant Examiner*—Virginia Ho
(74) *Attorney, Agent, or Firm*—Oblon, Spivak, McClelland, Maier & Neustadt, L.L.P.

(57) ABSTRACT

A decryption apparatus stores secret keys, each of which is specified by two nodes in tree structure in first memory, one of the two nodes indicated by ciphertext index information item of the decryptable ciphertext being an ancestor node of leaf and the other of the two nodes being a node which is not an ancestor node of leaf, and stores an identifier of decryption apparatus corresponding to a leaf in a tree structure in a second memory. The decryption apparatus acquires a plurality of ciphertexts, each ciphertext including a ciphertext index information item indicating two nodes in the tree structure which correspond to a decryption key for decrypting the respective ciphertext, and acquires a decryptable ciphertext from the plurality of ciphertexts. Further, the decryption apparatus selects, from the stored secret keys, a secret key corresponding to the respective ciphertext, and derives a decryption key from the selected secret key to decrypt the decryptable ciphertext by using the derived decryption key.

16 Claims, 17 Drawing Sheets

| i | k j | u node | v node |
|---|-----|--------|--------|
| 1 | 1 1 | 9 | 2 |
| 2 | 2 2 | 13 | 10 |
| 3 | 2 1 | 13 | 2 |
| 4 | 3 3 | 15 | 14 |
| 5 | 3 2 | 15 | 10 |
| 6 | 3 1 | 15 | 2 |

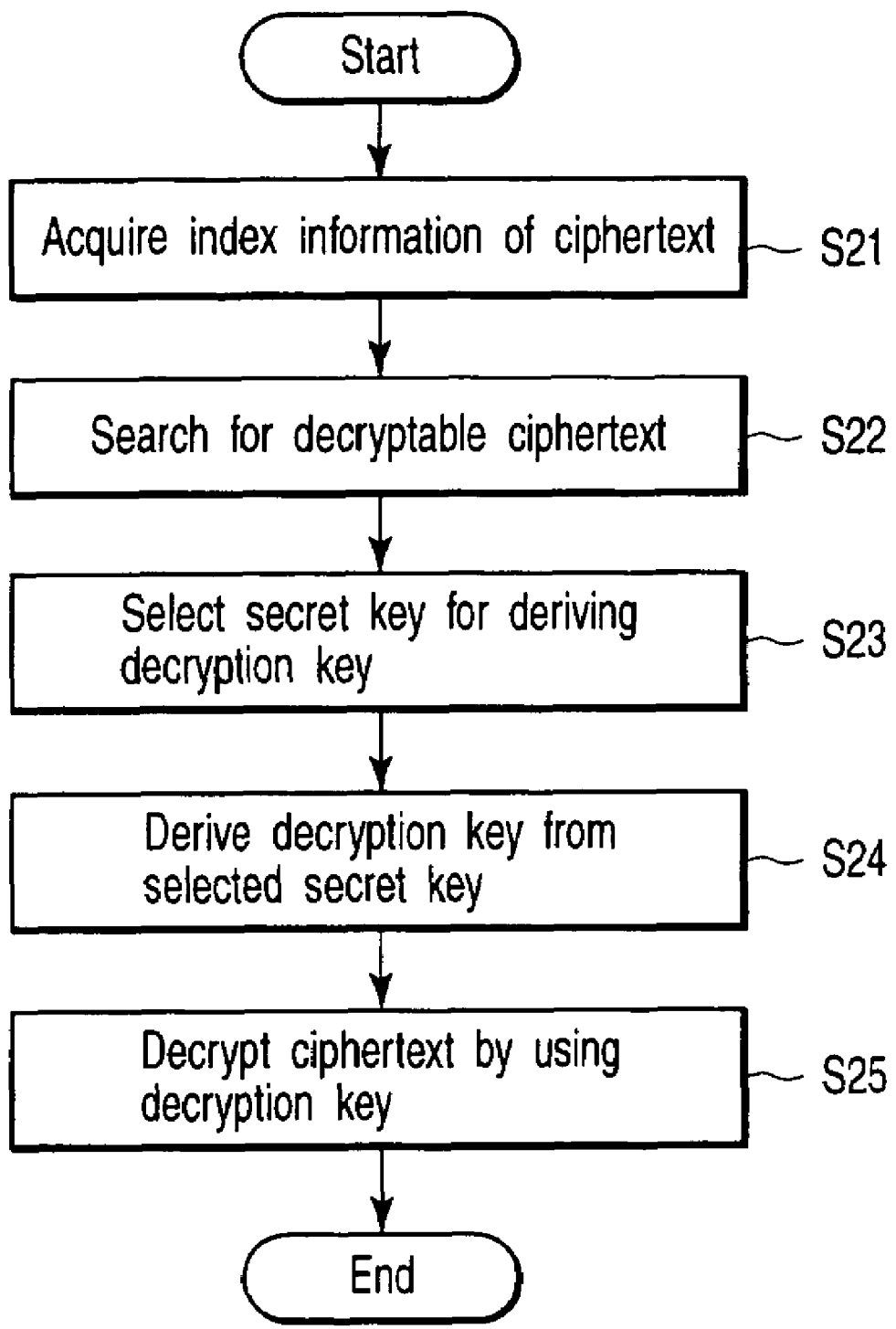
F I G. 1 2

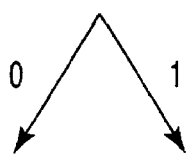
FIG. 14
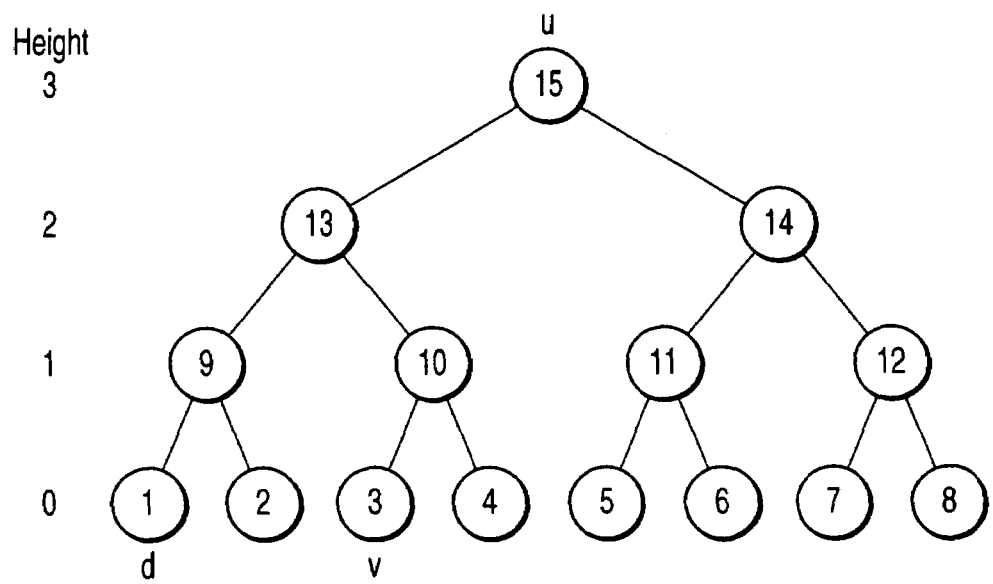
FIG. 15
| d | ⌈1⌋ | 0001 |
|---|---|---|
| v | v node= ⌈3⌋ | 0101 |
| U | u node= ⌈15⌋ | 1000 |
FIG. 16

| d | ⌈1⌋ | 0001 |
|---|---|---|
| V | v node = ⌈10⌋ | 0110 |
| U | u node = ⌈13⌋ | 0100 |

```
         t
       ←→
d ⌈1⌋   0 | 0  0  1
V ⌈10⌋  0 | 1  1  0
                     ←→ Mv=2
U ⌈13⌋  0 | 1  0  0
                  ←——→ Mu=3
        ←————————→
           L=4bit
```

DECRYPTION APPARATUS AND DECRYPTION METHOD

CROSS-REFERENCE TO RELATED APPLICATIONS

This application is based upon and claims the benefit of priority from prior Japanese Patent Application No. 2005-064219, filed Mar. 8, 2005, the entire contents of which are incorporated herein by reference.

BACKGROUND OF THE INVENTION

1. Field of the Invention

The present invention-relates to a decryption apparatus which decrypts a ciphertext.

2. Description of the Related Art

Conventionally, various kinds of cryptographic methods in broadcast cipher communication are known. Of these methods, a method capable of invalidating a secret key is useful. To invalidate a secret key is to eliminate the secret key of a decryption apparatus having a specific secret key (which will be referred to as an invalid decryption apparatus) from a system by encrypting a plaintext (encryption target data) in a form that it cannot be decrypted by the invalid decryption apparatus and can be decrypted by other decryption apparatuses.

If, for example, the secret key of a given decryption apparatus is leaked for some reason, a third party (who is not permitted by the sender to perform decryption) may acquire the leaked secret key and decrypt the ciphertext. It is therefore necessary to invalidate the secret key of the decryption apparatus. In such a case, invalidating the secret key makes it possible to eliminate all leaked secret keys (including copies) without withdrawing them.

As a cryptographic method which can invalidate secret keys, a subset difference method (to be referred to as an SD method hereinafter) which uses a binary tree structure of decryption apparatuses is known (reference 1: D. Naor, M. Naor, and J. Lotspiech: "Revocation and Tracing Schemes for Stateless Receivers," In Proc. of CRYPTO '01, LNCS 2139, Springer-Verlag, pp. 41-62, 2001).

The above method is an efficient method in the sense that transmission overhead is proportional only to the number of invalid decryption apparatuses. In the SD method, a binary tree with each decryption apparatus identifier (ID) assigned to a leaf (a lowermost node in the tree structure will be referred to as a leaf) is assumed, and a secret key is assigned to each node pair constituted by two arbitrary nodes in the binary tree structure. Each decryption apparatus is assigned a plurality of secret keys each of which satisfies a condition that a leaf indicated by the corresponding decryption apparatus ID has one of the above two nodes as an ancestor node but does not have the other node as an ancestor node, and index information representing two nodes corresponding to each of the secret keys. In this case, the ancestor node is a parent node of the leaf node or a parent node of the parent node and so on. For example, referring to FIG. 3, the ancestor nodes of leaf node "1" are nodes "9", "13", and "15". In practice, not all secret keys which satisfy the above condition are assigned to the corresponding decryption apparatus, and introducing a one-way function provides the decryption apparatus with a fewer number of secret keys from which all the secret keys satisfying the above condition can be derived, and index information corresponding to each of these secret keys.

In general, a sender transmits a plurality of ciphertexts, and index information indicating two nodes assigned to a decryption key for decrypting a ciphertext is added to each ciphertext. A recipient (decryption apparatus) who has received a plurality of ciphertexts determines whether each ciphertext can be decrypted by the decryption apparatus (this processing will be referred to as ciphertext determination process hereinafter). If the decryption apparatus is not an invalid decryption apparatus, a decryptable ciphertext always exists.

Subsequently, a secret key from which a decryption key for decrypting a ciphertext determined as decryptable can be derived is selected from the plurality of secret keys held by the decryption apparatus (this processing will be referred to as secret key selection process hereinafter).

Lastly, a decryption key is derived from the selected secret key, and the ciphertext is decrypted by using the derived decryption key.

As a cryptographic method which realizes secret key invalidation, the SD method is preferably used in terms of transmission overhead. However, the SD method has the following problem.

PROBLEM

It sometimes takes much processing time to acquire a plaintext after inputting a received ciphertext to a decryption apparatus. An exhaustive search must be performed for ciphertext determination and secret key selection process. In the worst case, ciphertext determination process must be performed the number of times corresponding to the number of ciphertexts received, and search must be performed for secret key selection the number of times corresponding to the number of secret keys held by the decryption apparatus. In general, since the number of ciphertexts received and the number of secret keys held by the decryption apparatus are large, the processing time required for ciphertext determination process and secret key selection process increases accordingly. As a consequence, it often takes much processing time to acquire a plaintext after inputting a received ciphertext to the decryption apparatus.

The present invention has, therefore, been made in consideration of the above problem, and has as its object to provide a decryption apparatus and decryption method which can reduce the processing time required to acquire a plaintext after inputting a received ciphertext to the decryption apparatus.

BRIEF SUMMARY OF THE INVENTION

According to embodiments of the present invention, a decryption apparatus (a) stores a plurality of secret keys, each of which is specified by two nodes in a tree structure in first memory; (b) stores an identifier of the decryption apparatus corresponding to a leaf in the tree structure in a second memory; (c) acquires each ciphertext and each ciphertext index information item indicating two nodes, in the tree structure, which correspond to a decryption key for decrypting the each ciphertext, to obtain a plurality of ciphertexts and a plurality of ciphertext index information items corresponding to respective ciphertexts; (d) acquires a decryptable ciphertext from the ciphertexts, one of the two nodes indicated by the ciphertext index information item of the decryptable ciphertext being an ancestor node of the leaf corresponding the identifier and the other of the two nodes being a node which is not an ancestor node of the leaf; (e) selects, from the secret keys stored in the first memory, a secret key from which the decryption key is derived; (f) derives the decryption key from the secret key selected; and (g) decrypts the decryptable ciphertext by using the decryption key derived.

BRIEF DESCRIPTION OF THE SEVERAL VIEWS OF THE DRAWING

FIG. 12 is a flowchart showing an outline of ciphertext decryption processing;

FIG. 14 is a view for explaining a code representing an arbitrary node in a tree structure;

FIG. 15 is a view showing a leaf, in a tree structure, which corresponds to a decryption apparatus ID, and u node and v node contained in the index information of a ciphertext which can be decrypted by the decryption apparatus;

FIG. 16 is a view showing codes representing a leaf, u node, and v node in the tree structure shown in FIG. 15;

DETAILED DESCRIPTION OF THE INVENTION

An embodiment of the present invention will be described below with reference to the views of the accompanying drawing.

First Embodiment

Figure 1:
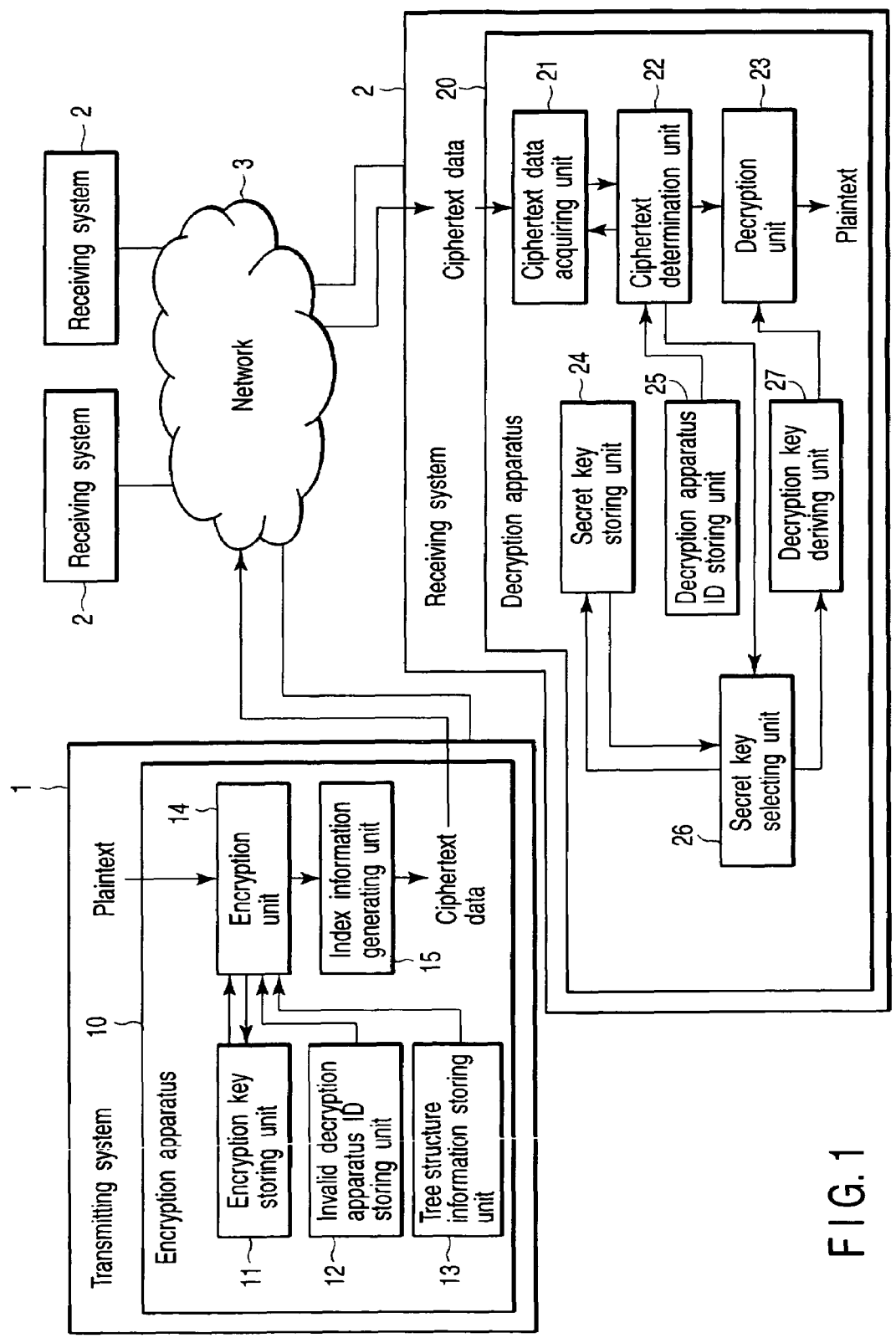
FIG. 1 is a block diagram showing an example of the arrangement of a data communication system according to an embodiment of the present invention.

FIG. 1 is a block diagram showing an example of the arrangement of a data communication system including a transmitting system on a ciphertext data transmitting side and a receiving system on a ciphertext data receiving side according to the first embodiment.

As shown in FIG. 1, in this data communication system, a transmitting system 1 including an encryption apparatus 10 is connected to n (n is a positive integer) receiving systems 2 each including a decryption apparatus 20 through a network 3.

In this case, the transmitting system 1 is designed to encrypt a plaintext and broadcast or multicast it through the network 3. Note that a plaintext may be digital data, e.g., video data, audio data, text data, or still image data, or a decryption key for decrypting another ciphertext or data for deriving the decryption key.

Each of the n receiving systems 2 receives the ciphertext data broadcast or multicast from the transmitting system 1 through the network 3 and decrypts it.

In the data communication system in FIG. 1, each network node corresponds to any one of the transmitting system 1 and receiving system 2, and only one network node is the transmitting system 1. However, a plurality of transmitting systems 1 may exist. In addition, one network node may have both the function of the transmitting system 1 and the function of the receiving system 2. Alternatively, all the network nodes may be made to have both the function of the transmitting system 1 and the function of the receiving system 2 to allow them mutually perform cipher communication.

The network 3 may be a wired or wireless network. The data communication system may use both a wired network and a wireless network. The network 3 may be a bidirectional or one-way network. Alternatively, the network 3 may be offline. That is, the ciphertexts and the like generated by the transmitting system 1 are stored in a recording medium such as a DVD, which is transferred to each receiving system 2. Each receiving system 2 reads ciphertexts and the like from the recording medium and decrypts them.

That is, as a means for exchanging information data between the transmitting system 1 and the receiving system 2 according to the following embodiment, any one of the means including wired/wireless communication, a recording medium, and the like can be used.

Figure 2:
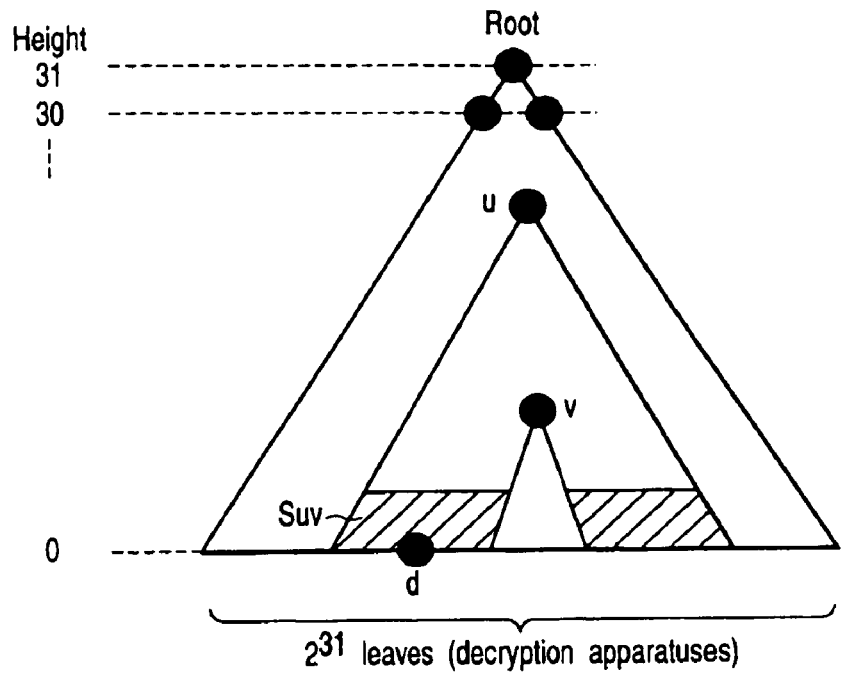
FIG. 2 is a schematic view of a tree structure in which a decryption apparatus ID is assigned to each leaf.

A tree structure having decryption apparatus identifiers (IDs) assigned to leaves and secret keys given to decryption apparatuses will be described prior to the description of the encryption apparatus 10 and decryption apparatus 20 in FIG. 1. Each decryption apparatus in this embodiment has a unique decryption apparatus identifier (ID), and each decryption apparatus ID corresponds to one arbitrary leaf in the tree structure, as shown in FIG. 2. FIG. 2 is a view schematically showing a tree structure in which decryption apparatus IDs are assigned to leaves.

Referring FIG. 2, each decryption apparatus ID is assigned to each leaf in the tree structure. The uppermost node in the tree structure is called a root. If the height of a leaf node in this tree structure is "0", and the height of the root node is "31", the number of leaves, i.e., the number of decryption apparatuses, is $2^{31}$ in total. One secret key is assigned to two nodes in the tree structure. Assume that when two nodes are written as u node and v node, respectively, u node is an upper node unless specified otherwise. Assume that a secret key assigned to u node and v node is written as kuv, and a set of leaves each having u node as an ancestor but not having v node as an ancestor is written as Suv. In this case, if a leaf assigned to a decryption apparatus ID d belongs to Suv, kuv is given as a secret key (or can be derived in the manner described later). As will be described later, a decryption apparatus derives a decryption key for decrypting a ciphertext by using a secret key.

Figure 3:
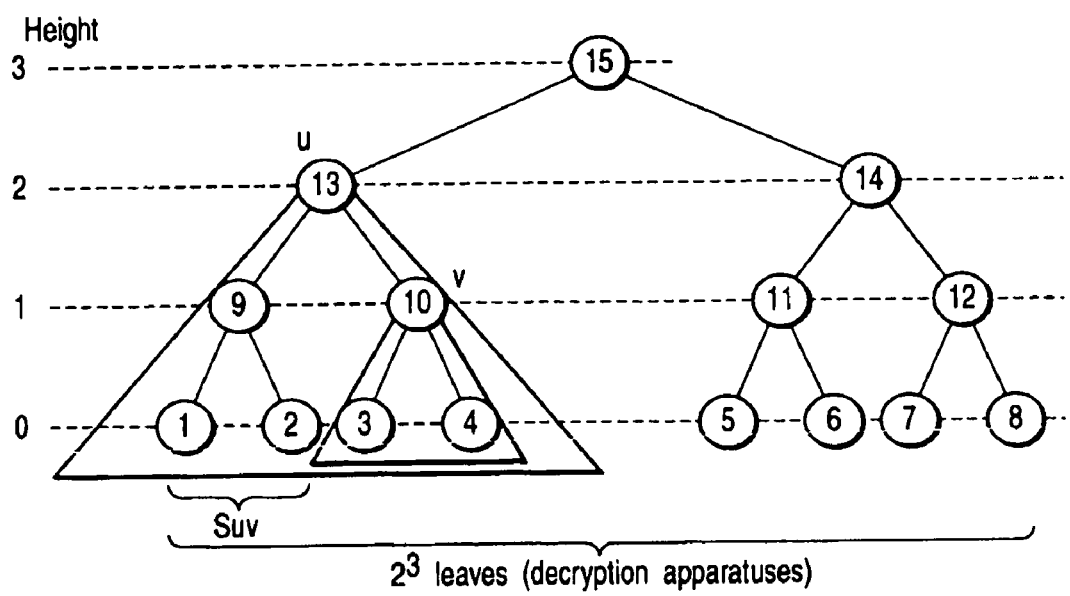
FIG. 3 is a view showing the tree structure in FIG. 2 in more detail.

FIG. 3 shows the tree structure in FIG. 2 in more detail, in which the height of root node "15" is "3". In this case, the number of leaves, i.e., the number of decryption apparatuses, is $2^3=8$ in total. If u node is node "13" in FIG. 3, and v node is node "10" in FIG. 3, Suv=S(13, 10) which is a set of leaves each having u node as an ancestor but not having v node as an ancestor becomes {node "1", node "2"}={1, 2}, and kuv=k(13, 10) is assigned to leaves (decryption apparatuses) belonging to S(13, 10).

If secret keys kuv are generated for all possible u node/v node combinations, secret keys to be given to all decryption apparatuses are generated. In this case, if secret keys kuv are independently generated for all possible u node/v node combinations, the number of secret keys held by each decryption apparatus becomes very large. Therefore, secret keys are given to each decryption apparatus in the manner shown in FIG. 4, as described in the reference 1.

Figure 4:
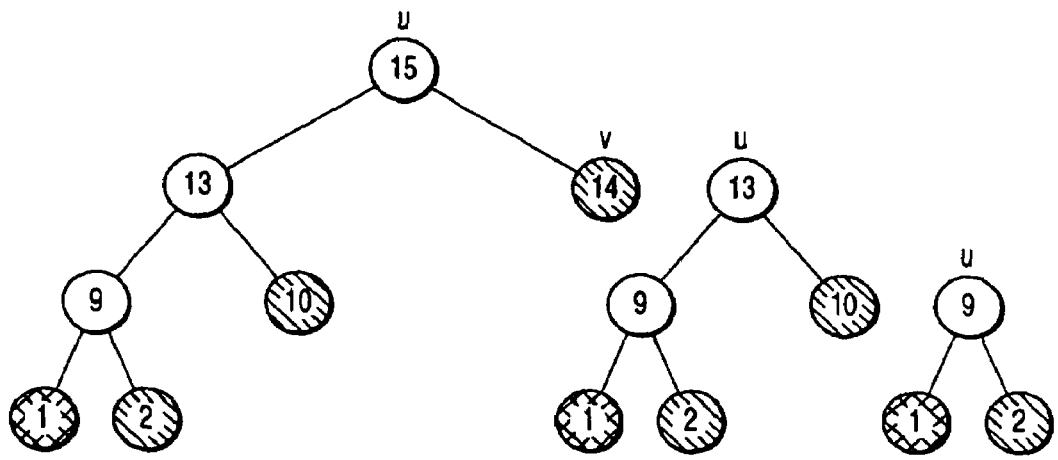
FIG. 4 is a view for explaining a secret key to be given to a decryption apparatus.

FIG. 4 shows an example of a tree structure similar to that shown in FIG. 3, with node "15" serving as a root. When all secret keys are to be generated independently, the secret keys to be given to a decryption apparatus corresponding to leaf "1" are: k(15, 14), k(15, 11), k(15, 12), k(15, 5), k(15, 6), k(15, 7), k(15, 8), k(15, 10), k(15, 3), k(15, 4), k(15, 2), k(13, 10), k(13, 3), k(13, 4), k(13, 2), and k(9, 2). In contrast to this, a one-way function G defined by the following expression is introduced to reduce the number of secret keys:

$$G:\{0,1\}^x \rightarrow \{0,1\}^{3x}$$

For example, using secret key k(15, 14) as in the following expression makes it possible to derive secret keys k(15, 11) and k(15, 12).

$$G(k(15,14))=k(15,11)\|Dk(15,14)\|k(15,12)$$

where ∥ represents the concatenation of data, and Dk(15, 14) is a decryption key for decrypting a ciphertext to which index information indicating that u node is "15" and v node is "14" is added. As a method of forming a function G, for example, a method of forming a function by using a hash function H with an output length x in the following manner is available.

$$G(k(15,14)) = H(k(15,14)\|s0)$$
$$\|H(k(15,14)\|s1)$$
$$\|H(k(15,14)\|s2)$$
$$= k(15,11)\|Dk(15,14)\|k(15,12)$$

where s0, s1, and s2 are constants. In the above case, s0 is a value for obtaining, from secret key k(15, 14), secret key k(15, 11) indicating that u node is node "15" and v node is left child node "11" of node "14", s1 is a value for obtaining secret key Dk(15, 14) for decrypting a ciphertext to which index information indicating that u node is node "15" and v node is node "14" is added from secret key k(15, 14), and s2 is a value for obtaining secret key k(15, 12) indicating that u node is node "15" and v node is right child node "12" of node "14" from secret key k(15, 14).

If the one-way function G is introduced, providing the following six secret keys as those given to a decryption apparatus corresponding to leaf "1": k(15, 14), k(15, 10), k(15, 2), k(13, 10), k(13, 2), and k(9, 2), makes it possible to derive other secret keys by using the one-way function G. For example, by applying the one-way function G to secret key k(15, 14), secret keys k(15, 11) and k(15, 12) are obtained. In addition, by further applying the one-way function G to k(15, 11), k(15, 5) and k(15, 6) are obtained. By applying the one-way function G to k(15, 12), k(15, 7) and k(15, 8) are obtained. Likewise, k(13, 3) and k(13, 4) are obtained from k(13, 10). Note that a common secret key (root key) may be given to all decryption apparatuses in addition to the above secret keys.

It is known that the number of secret keys can be further reduced by dividing a tree structure into smaller parts and handling them independently. Assume that the tree structure shown in FIG. 3 is divided into two tree structures respectively having node "13" and node "14" as roots. In this case, the secret keys given to a decryption apparatus corresponding to leaf "1" are three of the above six secret keys, namely k(13, 10), k(13, 2), and k(9, 2) in the tree structure having node "13" as a root. In this case, however, the transmission overhead becomes almost double.

Referring back to FIG. 1, the encryption apparatus 10 of the transmitting system 1 comprises an encryption key storing unit 11, invalid decryption apparatus ID storing unit 12, tree structure information storing unit 13, message encryption unit 14, and index information generating unit 15. In addition, assume that an interface means or the like for connection to the network 3 is prepared, as needed.

In the encryption key storing unit 11, encryption keys corresponding to arbitrary u node/v node combinations are stored. In this case, either symmetric key cryptosystem or public key cryptosystem may be used for the encryption of plaintexts. For the sake of simplicity, consider a case wherein symmetric key cryptosystem is used for the encryption of plaintexts. In this case, encryption and decryption keys corresponding to given u node and v node are identical to each other. Instead of all encryption keys, information by which encryption keys corresponding to arbitrary u node/v node combinations can be derived may be stored in the encryption key storing unit 11.

The invalid decryption apparatus ID storing unit 12 stores the ID of a decryption apparatus which is not permitted to decrypt any message. The tree structure information storing unit 13 stores information associated with the size of the tree structure (e.g., information which can specify the height of the tree structure, the number of leaves, and the like).

Figure 5:
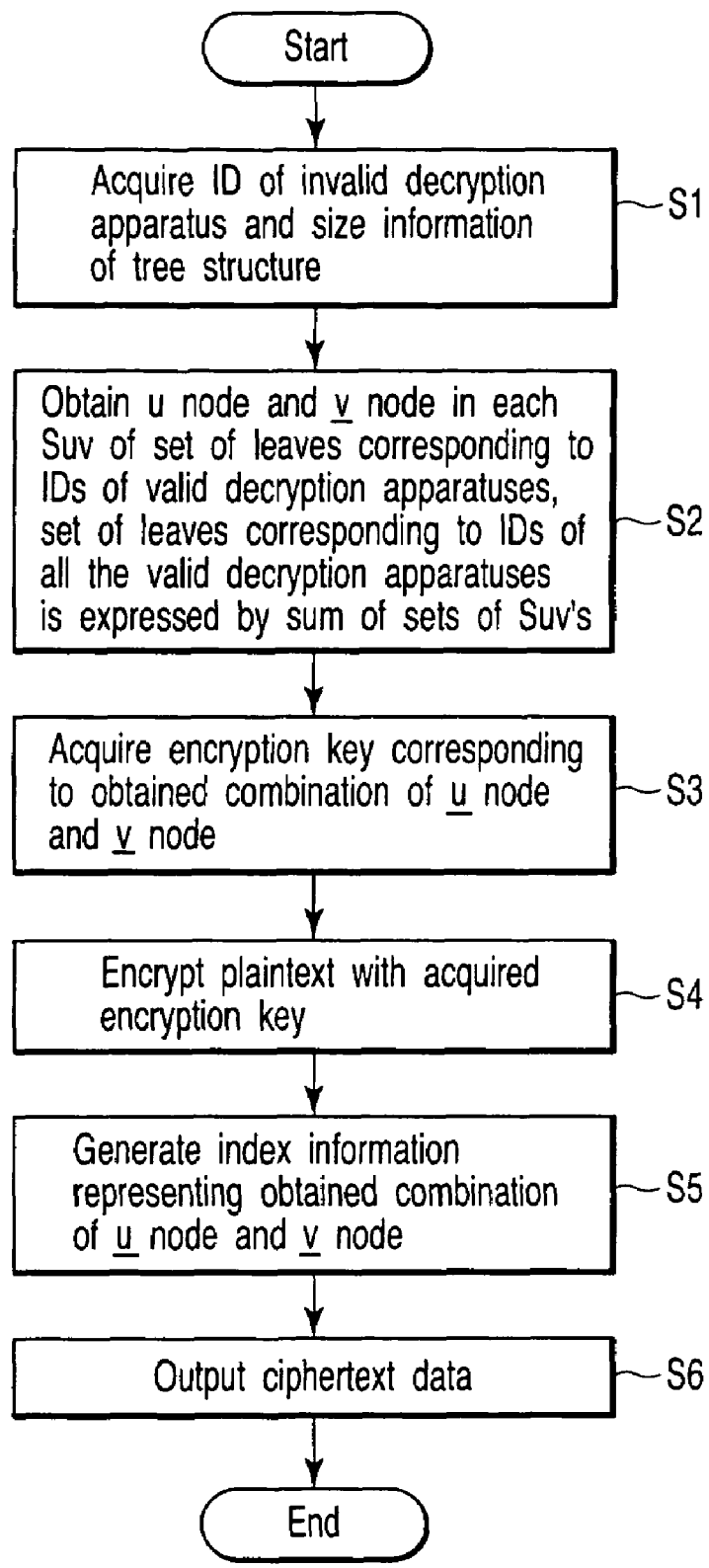
FIG. 5 is a flowchart for explaining encryption process in an encryption apparatus.

FIG. 5 is a flowchart for explaining encryption processing operation in the encryption apparatus 10. The message encryption unit 14 receives the ID of an invalid decryption apparatus from the invalid decryption apparatus ID storing unit 12, and receives information associated with the size of the tree structure from the tree structure information storing unit 13 (step S1). A set of leaves corresponding to the IDs of valid decryption apparatuses which can decrypt ciphertexts are obtained as a sum of sets of Suv's, and a u node/v node combination in each Suv included in the sum of sets of Suv's is obtained by the technique described in the reference 1 (step S2).

Figure 6:
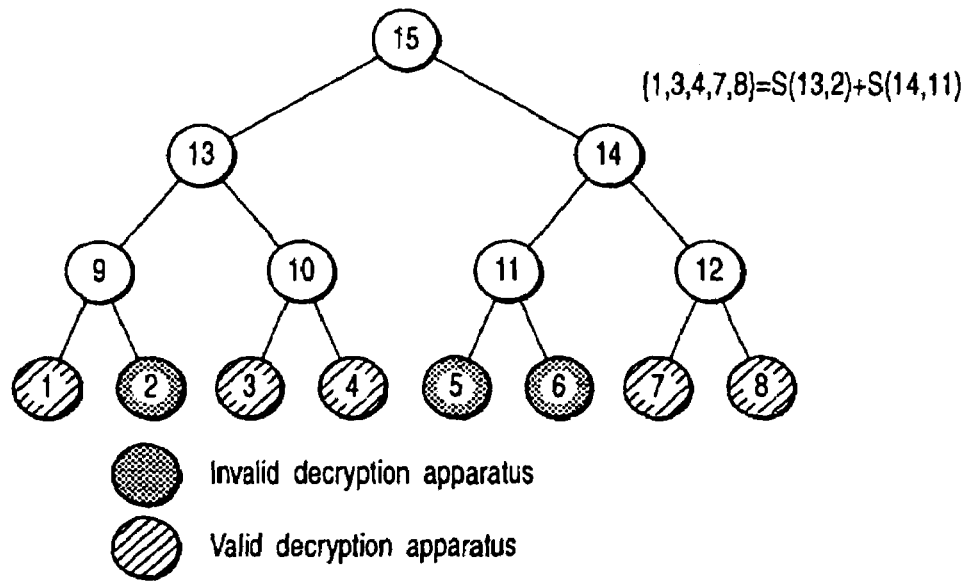
FIG. 6 is a view for explaining a method of selecting a leaf set in the SD method in the encryption apparatus.

Assume that leaves "1" to "8" respectively correspond to decryption apparatuses "1" to "8", and decryption apparatuses "2", "5", and "6" are invalid decryption apparatuses, as shown in FIG. 6. In this case, set {1, 3, 4, 7, 8} of leaves corresponding to valid decryption apparatuses excluding the invalid decryption apparatuses can be expressed as a sum of set S(13, 2)={1, 3, 4} of leaves and set S(14, 11)={7, 8} of leaves, the set S(13, 2)={1, 3, 4} of leaves each having node "13" as an ancestor but not having node "2" as an ancestor, and the set S(14, 11)={7, 8} of leaves each having node "11" as an ancestor but not having node "11" as an ancestor, i.e. {1, 3, 4, 7, 8}=S(13, 2)+S(14, 11)

In this case, valid decryption apparatuses "1", "3", and "4" are provided with (or can derive) secret key k(13, 2) corresponding to a u node/v node combination of S(13, 2), but invalid decryption apparatus "2" is not provided with (or cannot derive) the secret key. Note that secret key k(13, 2) is not given to (or cannot be derived) leaves "5" to "8". In addition, leaves "7" and "8" are provided with secret key k(14, 11) corresponding to a u node/v node combination of S(14, 11), but leaves "5" and "6" are not provided with (or cannot derive) the secret key. Note that leaves "1" to "4" are not provided with (or cannot derive) secret key k(14, 11) from the beginning.

In the case shown in FIG. 6, therefore, an encryption key corresponding to decryption key Dk(13, 2) which can be derived from secret key k(13, 2) which is not given to the invalid decryption apparatus corresponding to leaf "2" (when symmetric key cryptosystem is to be used for the encryption of plaintexts, the corresponding encryption key is also Dk(13, 2)) and an encryption key corresponding to decryption key Dk(14, 11) which can be derived from secret key k(14, 11) which is not given to the invalid decryption apparatuses corresponding to leaves "5" and "6" (when symmetric key cryptosystem is to be used for the encryption of plaintexts, the corresponding encryption key is also Dk(14, 11)) are acquired from the encryption key storing unit 11 (step S3). An input plaintext is encrypted by each of the obtained encryption keys (step S4).

In the case of the tree structure shown in FIG. 6, when a plaintext is encrypted by using each of encryption key Dk(13, 2) and encryption key Dk(14, 11) into two ciphertexts, only valid decryption apparatuses "1", "3", "4", "7", and "8" of decryption apparatuses "1" to "8" which have received this ciphertext can decrypt the ciphertext.

The index information generating unit 15 generates index information indicating a u node /v node combination corresponding to each decryption key for decrypting each generated ciphertext (step S5). The index information indicating the u node/v node combination corresponding to the decryption key for decrypting each ciphertext is added to the ciphertext, and the resultant data is output as ciphertext data (step S6). In this embodiment, a ciphertext is the one obtained by encrypting a plaintext, and ciphertext data contains a ciphertext and index information corresponding to the ciphertext.

Figure 7:
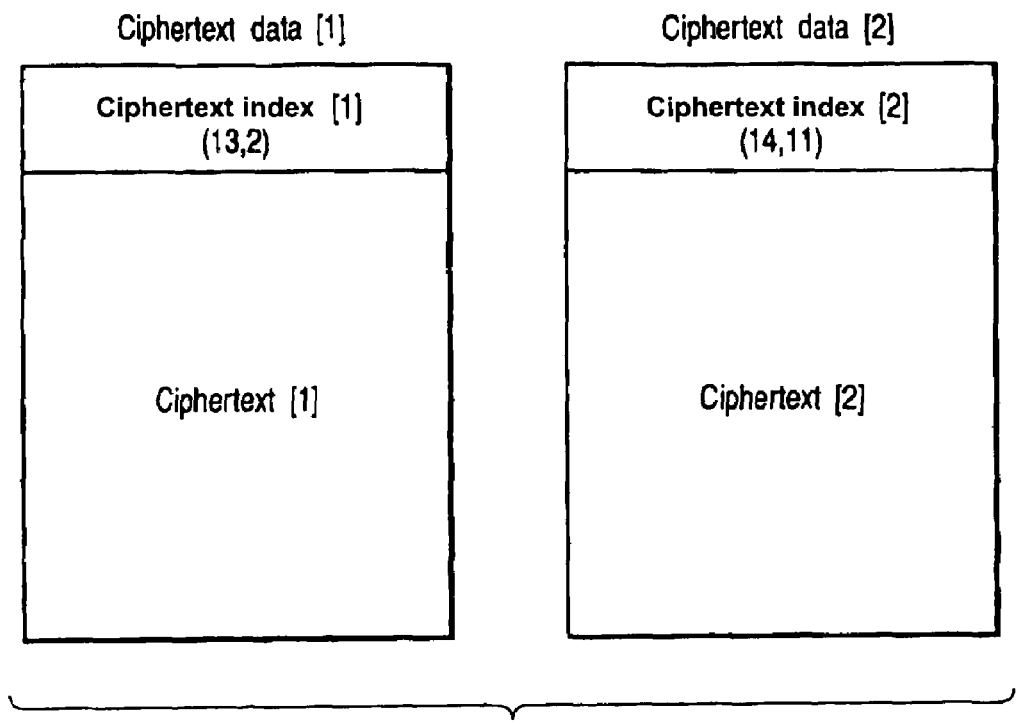
FIG. 7 is a view showing an example of the data structure of ciphertext data.

FIG. 7 shows an example of the data structure of ciphertext data output from the encryption apparatus 10. As shown in FIG. 7, each ciphertext data contains the ciphertext generated by using the encryption key obtained in step S3 and index information (ciphertext index information) indicating a u node/v node combination corresponding to a decryption key for decrypting the ciphertext. For example, ciphertext index information "13, 2" is added to ciphertext [1] generated by using encryption key Dk(13, 2), and ciphertext index information "14, 11" is added to ciphertext [2] generated by using encryption key Dk(14, 11).

The decryption apparatus 20 in the receiving system includes a ciphertext data acquiring unit 21, ciphertext determination unit 22, decryption unit 23, secret key storing unit 24, decryption apparatus identifier (ID) storing unit 25, secret key selecting unit 26, and decryption key deriving unit 27. Note that an interface means or the like for connection to the network 3 is prepared, as needed.

Figure 8:
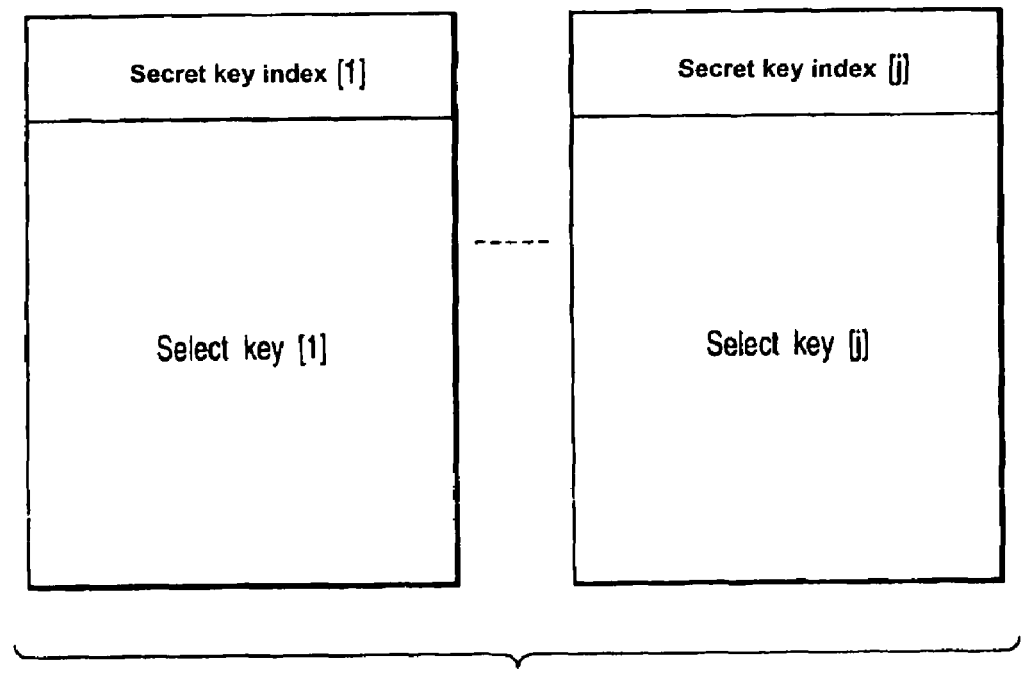
FIG. 8 is a view showing an example of the data structure of a secret key stored in a secret key storing unit.

As shown in FIG. 8, the secret key given to the decryption apparatus 20 and index information (secret key index information) indicating a u node/v node combination corresponding to the secret key is stored (or only the secret key of the decryption apparatus may be stored, as will be described later) in the secret key storing unit 24.

The identifier (ID) of the decryption apparatus is stored in the decryption apparatus identifier (ID) storing unit 25.

The ciphertext data acquiring unit 21 acquires the ciphertext data input to the decryption apparatus 20.

The ciphertext determination unit 22 determines whether the decryption apparatus can decrypt the ciphertext acquired by the ciphertext data acquiring unit 21.

The secret key selecting unit 26 selects, from the secret keys stored in the secret key storing unit 24, a secret key from which a decryption key for decrypting the ciphertext determined as decryptable by the ciphertext determination unit 22 can be derived.

The decryption key deriving unit 27 derives a decryption key for decrypting the ciphertext determined as decryptable by the ciphertext determination unit 22 by using the secret key selected by the secret key selecting unit 26.

The decryption unit 23 decrypts the ciphertext determined as decryptable by the ciphertext determination unit 22 by using the decryption key derived by the decryption key deriving unit 27.

The secret keys stored in the secret key storing unit 24 may be stored in a predetermined order. A storage order determining method will be described with reference to the flowchart of FIG. 9. First of all, variables i, j, and k are set to "1" (step S11). A leaf indicating the ID of the decryption apparatus is set as $A_1$ node (step S12). A parent node of $A_k$ node is set as u node, and a sibling node of $A_j$ node is set as v node (step S13). A secret key corresponding to the above u node/v node combination is stored as the ith secret key (step S14).

It is then determined whether all given secret keys are stored (step S15). If all the secret keys are completely stored, the processing is terminated. If not all the secret keys are completely stored, i is incremented by one, and j is decremented by one (step S16). It is checked whether j=0. If j≠0 (step S17), the flow returns to step S13. If j=0 (step S17), the parent node of $A_k$ node is set to $A_{k+1}$ node (step S18), and k is incremented by one. The value of k (after incrementation) is substituted into j (step S19). The flow then returns to step S13.

Figure 9:
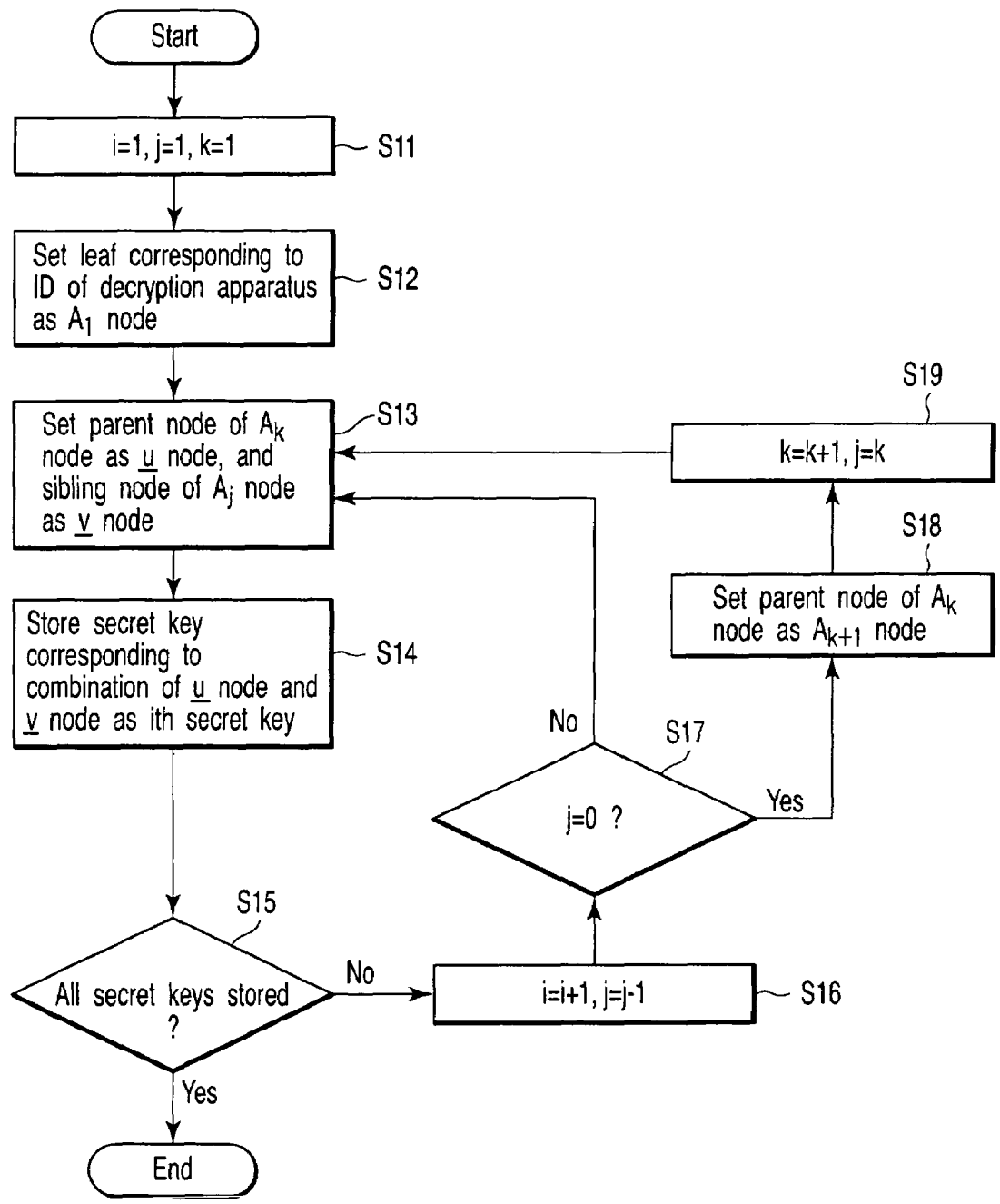
FIG. 9 is a flowchart for explaining a method of determining the storage order of secret keys to be stored in the secret key storing unit.
Figures 10, 11:
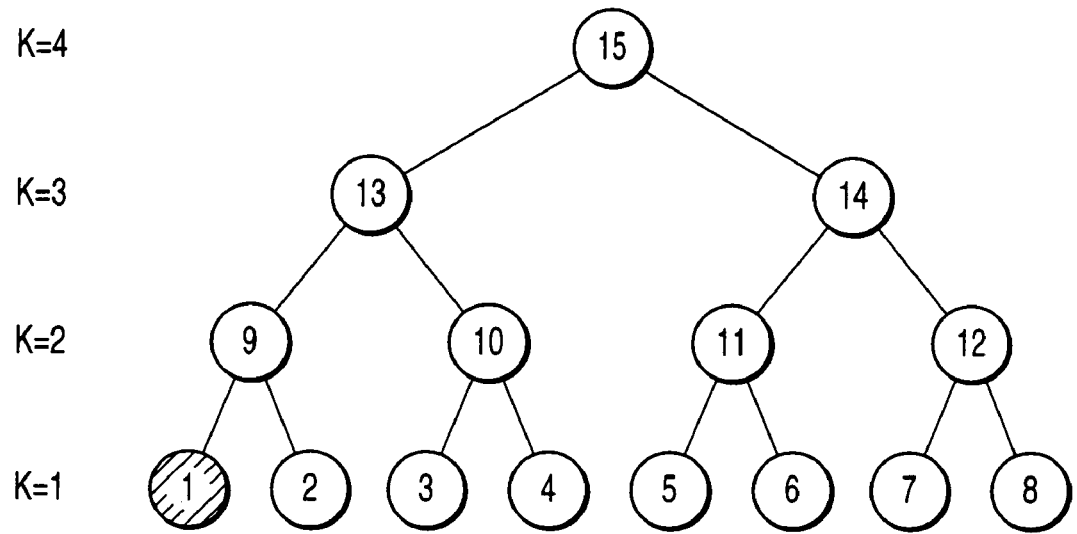
FIG. 10 is a view showing an example of a tree structure.
FIG. 11 is a view for explaining a method of determining the storage order of secret keys to be stored in the secret key storing unit.

Assume that a leaf ($A_1$ node) indicated by the ID of the decryption apparatus is leaf "1" in the tree structure shown in FIG. 10. The secret keys given to the decryption apparatus corresponding to leaf "1" are k(15, 14), k(15, 10), k(15, 2), k(13, 10), k(13, 2), and k(9, 2). The above operation will be described in more detail with reference to FIG. 11 by exemplifying a case wherein the storage order of these secret keys is determined in accordance with the flowchart of FIG. 9.

First of all, in the case of i=1 ($A_k=A_1$, $A_j=A_1$), since a parent node of $A_1$ node (leaf "1") is node "9", and a sibling node of "$A_1$" node (leaf "1") is node "2" (step S13), a u node/v node combination corresponding to the (i=1)st secret key is {9, 2} (first sequence of steps S13 to S15).

In the case of i=2 ($A_k=A_2$, $A_j=A_2$), since a parent node of "$A_2$" node (node "9") is node "13", and a sibling node of "$A_2$" node (node "9") is node "10" (step S13), a u node/v node combination corresponding to the (i=2)nd secret key is {13, 10} (second sequence of steps S13 to S15).

In the case of i=3 ($A_k=A_2$, $A_j=A_1$), since a parent node of "$A_2$" node (node "9") is node "13", and a sibling node of "$A_1$" node (leaf "1") is node "2" (step S13), a u node/v node combination corresponding to the (i=3)rd secret key is {13, 2} (third sequence of steps S13 to S15).

In the case of i=4 ($A_k=A_3$, $A_j=A_3$), since a parent node of "$A_3$" node (node "13") is node "15", and a sibling node of "$A_3$" node (node "13") is node "14" (step S13), a u node/v node combination corresponding to the (i=4)th secret key is {15, 14} (fourth sequence of steps S13 to S15).

In the case of i=5 ($A_k=A_3$, $A_j=A_2$), since a parent node of "$A_3$" node (node "13") is node "15", and a sibling node of "$A_2$" node (node "9") is node "10" (step S13), a u node/v node combination corresponding to the (i=5)th secret key is {15, 10} (fifth sequence of steps S13 to S15).

In the case of i=6 ($A_k=A_3$, $A_j=A_1$), since a parent node of "$A_3$" node (node "13") is node "15", and a sibling node of "$A_1$" node (leaf "1") is node "2" (step S13), a u node/v node combination corresponding to the (i=6)th secret key is {15, 2} (sixth sequence of steps S13 to S15).

Referring to FIG. 10, when this storage order determining method is used, secret keys k(9, 2), k(13, 10), k(13, 2), k(15, 14), k(15, 10), and k(15, 2) are stored in a decryption apparatus corresponding to leaf "1" in the order named. In the above example, secret keys are stored in ascending order of u node position in the tree structure (storage begins from u node corresponding to node "9"). However, secret keys may be stored in descending order of u node position in the tree structure (in the case shown in FIG. 10, storage begins from u node corresponding to node "15"). In the above example, with the same u node, secret keys are stored in descending order of v node position in the tree structure. In contrast, however, secret keys may be stored in ascending order of v node position in the tree structure (in the case shown in FIG. 10, although when u node is node "13", node "10" and node "2" can be v nodes, a secret key corresponding to node "2" as v node may be stored first).

Storing secret keys in this order in advance makes it possible to efficiently search for a secret key which should be selected in secret key selection, as will be described later. In the above case, secret keys to be stored in the secret key storing unit 24 are stored in a predetermined order. However, secret keys may be stored without setting any specific storage order. In addition, as will be described later, since a ciphertext can be decrypted without using any index information indicating a u node/v node combination corresponding to a secret key, secret keys may be stored without storing any index information indicating a u node/v node combination corresponding to a secret key. Obviously, both a secret key and index information indicating a u node/v node combination corresponding to the secret key may be stored.

FIG. 12 is a flowchart showing an outline of decryption processing for a ciphertext. First of all, the ciphertext determination unit 22 acquires the index information of a ciphertext (a ciphertext index information) from the ciphertext data acquired by the ciphertext data acquiring unit 21 (step S21). The ciphertext determination unit 22 then determines whether the decryption apparatus can decrypt the ciphertext corresponding to the acquired index information of the ciphertext, and searches for a ciphertext that can be decrypted by the decryption apparatus (step S22). Thereafter, the secret key selecting unit 26, from the secret keys stored in the secret key storing unit 24, selects a secret key from which a decryption key for decrypting the ciphertext determined as decryptable by the ciphertext determination unit 22 can be derived (step S23). The decryption key deriving unit 27 derives a decryption key for decrypting the ciphertext determined as decryptable by the ciphertext determination unit 22 by using the secret key selected by the secret key selecting unit 26 (step S24). The decryption unit 23 decrypts the ciphertext determined as decryptable by the ciphertext determination unit 22 by using the decryption key derived by the decryption key deriving unit 27 (step S25).

Figure 13:
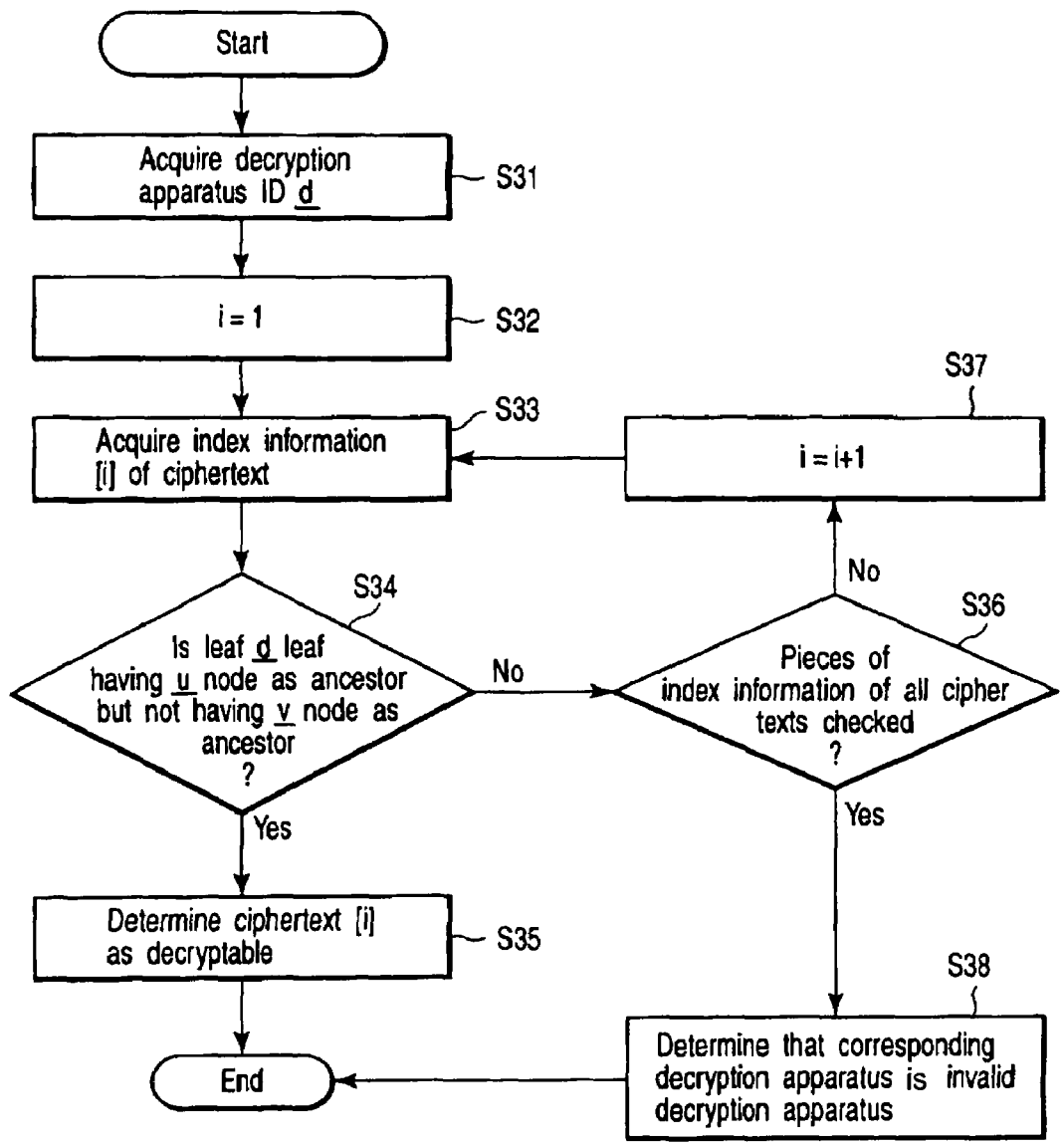
FIG. 13 is a flowchart for explaining ciphertext determination processing.

FIG. 13 is a flowchart for explaining ciphertext determination processing in step S22 in FIG. 12. First of all, an ID d of the decryption apparatus which is stored in the decryption apparatus ID storing unit 25 is acquired (step S31), and a variable i is set to "1" (step S32). Index information [i] of the ciphertext contained in the ith ciphertext data is acquired from the ciphertext data acquiring unit 21 (step S33), and u node and v node indicated by index information [i] are extracted. It is then determined whether the leaf indicated by the ID d of the decryption apparatus is a leaf having u node as an ancestor but not having v node as an ancestor in the tree structure provided in advance (step S34). If the leaf indicated by the ID d of the decryption apparatus is a leaf having u node as an ancestor but not having v node as an ancestor in the tree structure provided in advance (YES in step S34), the flow advances to step S35 to determine that ciphertext [i] corresponding to index information [i] can be decrypted (step S35). The processing is then terminated. If the leaf indicated by the ID d of the decryption apparatus is not a leaf having u node as an ancestor but not having v node as an ancestor in the tree structure provided in advance (NO in step S34), the flow advances to step S36.

It is determined in step S36 whether the pieces of index information of all the ciphertexts acquired by the ciphertext data acquiring unit 21 have undergone the checks in steps S33 and S34 (step S36). If there is any index information of a ciphertext which has not undergone the checks (NO in step S36), the flow advances to step S37 to increment i by "1". The flow then returns to step S33. If it is determined in step S36 that the pieces of index information of all the ciphertexts have undergone the checks, it is determined that the decryption apparatus is an invalid decryption apparatus (step S38), and the processing is terminated after the corresponding information is notified as needed.

Note that step S31 need not always be performed before steps S32 and S33, and may be performed once before step S34. For example, steps S32, S33, and S31 may be executed in the order named, or step S31 may be performed simultaneously with steps S32 and S33.

Figure 13A:
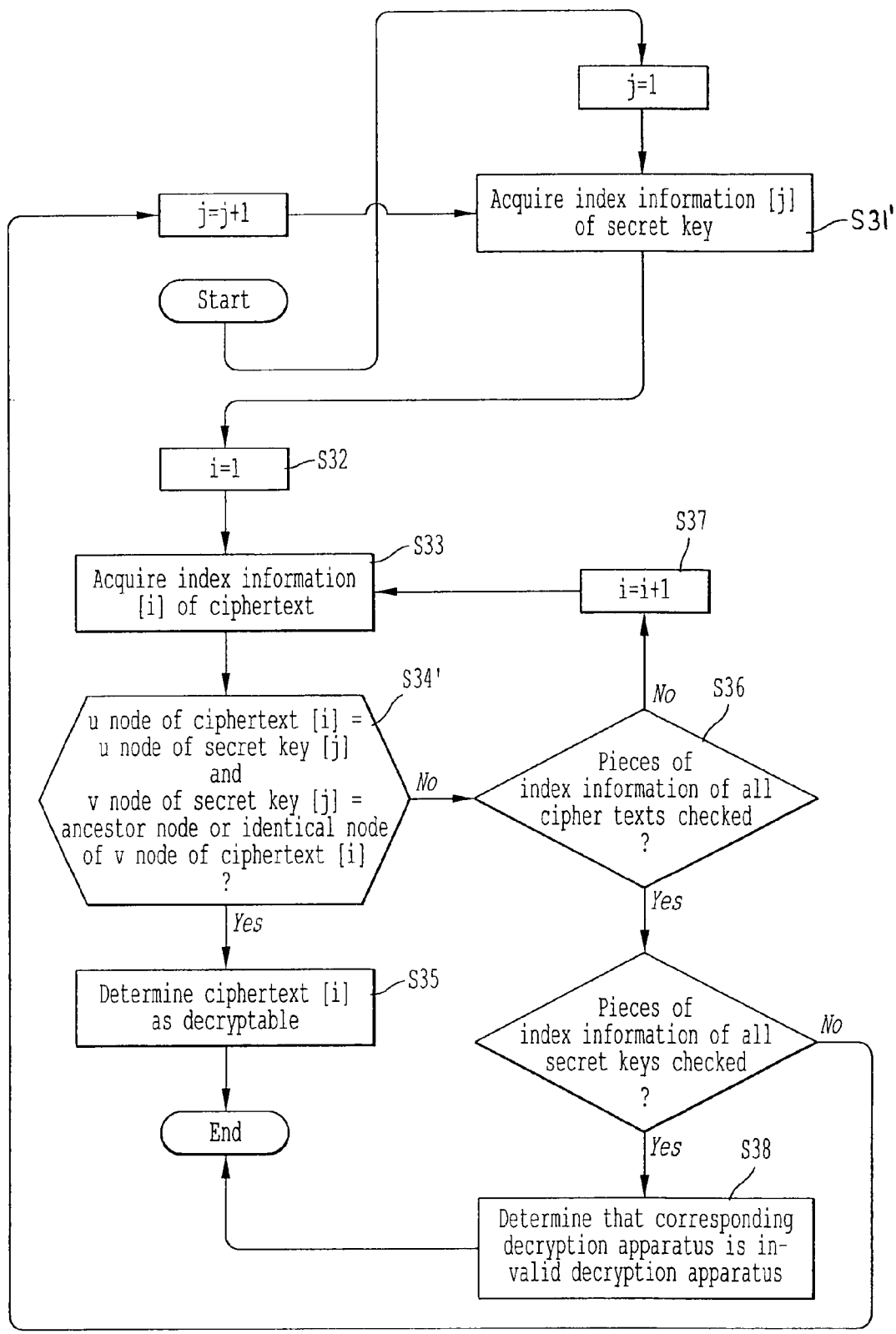
FIG. 13A is an alternate flowchart for explaining ciphertext determination processing.

As will be described later as shown in FIG. 13A, in ciphertext determination processing, the index information of a secret key can be used instead of the ID d of the decryption apparatus. In this case, in step S31', index information indicating a u node/v node combination corresponding to a secret key stored in the secret key storing unit 24 is acquired instead of the ID d of the decryption apparatus. In addition, in ciphertext determination processing, both the ID d of the decryption apparatus and the index information of a secret key can be used. In this case, the ID d of the decryption apparatus and the index information of a secret key are acquired.

Specific processing in step S34 will be described below. The nodes in the tree structure are coded in advance in the following manner. As shown in FIG. 14, in the tree structure, "0" is assigned to a path descending from a given parent node to a left child node, and "1" is assigned to a path descending to a right child node, thereby expressing paths from the root to a target node (including a leaf) by "0" and "1" in the above manner. Thereafter, one "1" and a necessary number of "0"s are added to the end of the above code. That is, "10 . . . 0" is added. A bit length L of a code representing each node (including a leaf) is determined in advance in accordance with the height of the tree structure to be applied to this system.

For example, as shown in FIG. 15, the specified value L of the bit length of a code representing each node (including a leaf) is four bits when the height of the tree structure is three. As shown in FIG. 2, when the height of the tree structure is 31, the bit length is 32 bits.

After a path from the root to a target node (including a leaf) is expressed by "0" and "1" in the above manner, "1" is added to the end of the resultant code. In addition, in order to make bit lengths equal to the specified value L, the necessary number of padding bits "0"s are added to the resultant code (when the number of bits is less than the specified value L), thus obtaining the code of the target node (including a leaf).

In the tree structure in which the root is "15" as shown in FIG. 15, since the bit length of the code of each node is four bits, leaf "1", leaf "3", and root "15" can be expressed by codes "0001", "0101", and "1000", respectively, as shown in FIG. 16. From the viewpoint of the least significant bit of each code, bits until the first appearance of "1" can be regarded as redundant bits for making the bit length equal to L. For example, in the codes of leaf "3" and leaf "1", the last one bit "1" is a redundant bit, and in the code of root "15", "1000" are redundant bits. In this embodiment, the least significant bit means the rightmost bit of each code, and the most significant bit means the leftmost bit of each code.

In the decryption apparatus ID storing unit 25 of the decryption apparatus corresponding to leaf "1" in the tree structure shown in FIG. 15, "0001" is stored as the apparatus ID d. In addition, u node and v node contained in the index information of a ciphertext are expressed by codes like those described above.

Figures 17, 18:
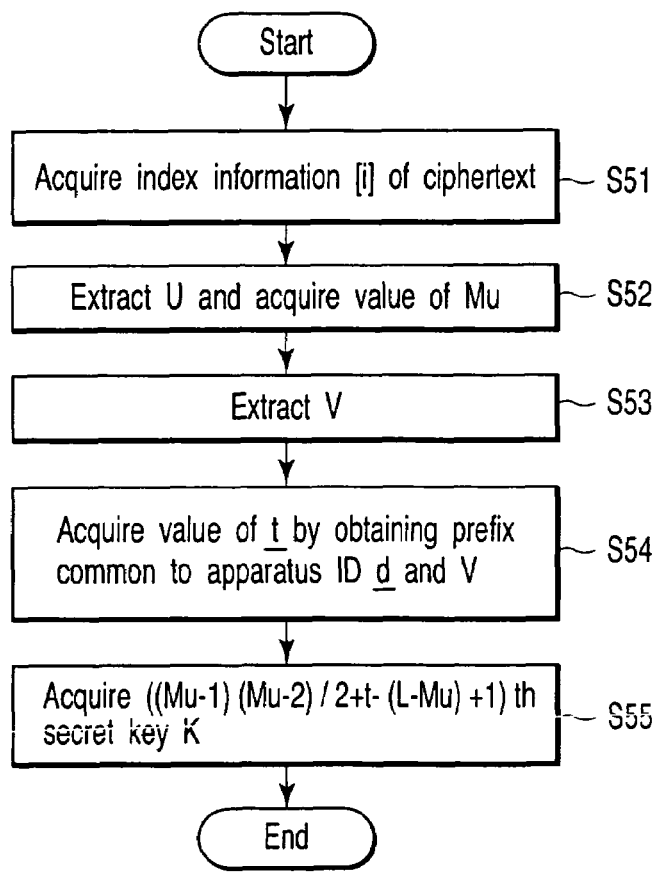
FIG. 17 is a view for explaining a method of determining whether a ciphertext can be decrypted, by using a code representing a decryption apparatus ID, a code representing u node and a code representing v node which are contained in the index information of a ciphertext.
FIG. 18 is a flowchart for explaining secret key selection processing.

Assume that the codes of u node (for example, node "15" in FIG. 15) and v node (for example, leaf "3" in FIG. 15) contained in index information [i] of the ciphertext acquired in step S33 in FIG. 13 are represented by U and V, respectively, as shown in FIG. 17. That is, U="1000" and V="0101".

Let Mv be the bit length (padding length) of the redundant bits of V, and Mu be the bit length (padding length) of the redundant bits of U. In this case, Mv=1 and Mu=4.

That the leaf indicate by the ID d of the decryption apparatus has u node as an ancestor in the tree structure means that the following expression holds:

$$(d \wedge U) \gg Mu == 0 \quad (x1)$$

where ^ represents an exclusive OR for each bit, >> represents a right shift, and == represent equivalence. For example, after the exclusive OR between d and U each having the length L as shown in FIG. 17 is calculated, each of the resultant bits is shifted to the right by Mu bits (four bits in this case), and the empty bits are padded with "0" s to obtain "0000". When "0000" is converted into a numerical value (converted from binary to decimal), "0" is obtained. It can therefore be said that the leaf indicated by the ID d has u node as an ancestor.

In addition, that the leaf does not have v node as an ancestor means that the following expression holds:

$$(d \wedge V) \gg Mv != 0 \quad (x2)$$

where != represents non-equivalence. For example, after the exclusive OR between d and V each having the length L as shown in FIG. 17 is calculated, each of the resultant bits is shifted to the right by Mv bits (one bit in this case), and the empty bits are padded with "0" s to obtain "0010". When "0010" is converted into a numerical value, "0" is not obtained. It can therefore be said that the leaf indicated by the ID d does not have v node as an ancestor.

In step S34 in FIG. 13, expressions (x1) and (x2) are applied to codes representing u node and v node contained in index information [i] of each ciphertext [i] to determine whether ciphertext [i] can be decrypted by a decryption apparatus having the ID d.

In the above case, determination is performed by using the ID d of the decryption apparatus and the index information of a ciphertext. However, the present invention is not limited to this, and determination may be performed by using the index information of a secret key and the index information of a ciphertext as shown in FIG. 13A. Let Mu be the redundant bit length (padding length) of coded data (U) representing u node contained in index information [i] of a ciphertext, Mv be the redundant bit length (padding length) of coded data (V) representing v node contained in index information [i] of the ciphertext, Mu' be the redundant bit length (padding length) of coded data (U') representing u node contained in index information [i] of a secret key stored in the secret key storing unit 24, and My' be the redundant bit length (padding length) of coded data (V') representing v node contained in the index information [i] of the secret key stored in the secret key storing unit 24. In step S34', it is determined by using two expressions given below whether ciphertext can be decrypted by the decryption apparatus having the ID d.

$$Mu == Mu' \quad (x3)$$

$$(V \& Mv') == (V' \& Mv') \quad (x4)$$

where & represents logical product for each bit. As in the case shown in FIG. 4, for all u node/v node combinations corresponding to the secret keys given to the decryption apparatus having the ID d, it holds that the leaf indicated by the ID d of the decryption apparatus has u node as an ancestor but does not have v node as an ancestor. If, therefore, expressions (x3) and (x4) hold, since u node corresponding to ciphertext [i] is identical to u node corresponding to the secret key [j] and v node corresponding to the secret key [j] is an ancestor (or an identical node) of v node corresponding to the ciphertext [i], it holds that the leaf indicated by the ID d of the decryption apparatus has u node as an ancestor but does not have v node as an ancestor. Even by this method, with regard to u node and v node corresponding to the ciphertext, it can be determined whether the leaf indicated by the ID d of the decryption apparatus is a leaf having u node as an ancestor but not having v node as an ancestor in the tree structure provided in advance.

Secret key selection processing by the secret key selecting unit 26 will be described with reference to the flowchart of FIG. 18. Index information [i] of the ciphertext corresponding to ciphertext [i] determined as decryptable in step S35 in FIG. 13 is acquired (step S51). Coded data (U) indicating u node which is contained in index information [i] is extracted, and the value of the padding length Mu of U is acquired (step S52). If Mu is acquired in the determination processing in step S34 in FIG. 13, step S52 may be omitted. The coded data (V) indicating v node which is contained in index information [i] is extracted (step S53). Note that if V is acquired in the determination processing in step S34 in FIG. 13, step S53 may be omitted. In step S53, the value of the padding length Mv of V which is used for decryption key deriving operation to be described later may be acquired. Note that Mv can be acquired in the determination processing in step S34 in FIG. 13, as described above.

As shown in FIG. 17 (the tree structure shown in FIG. 14 is assumed in FIG. 17), assume that the apparatus ID d is "0001" corresponding to leaf "1", V is "0101" corresponding to leaf "3", and U is "1000" corresponding to root node "15".

Subsequently, a search is made for a prefix common to the apparatus ID d and V, and the value of a bit length t of the common prefix is acquired (step S54). A prefix common to d and V means a bit string before a bit-by-bit comparison between d and V, starting from the most significant bits of the coded data, indicates a mismatch for the first time. However, this comparison does not include any redundant bits (padding bits). In the case shown in FIG. 17, since the first bits are identical, the common prefix is "0", and the bit length t is "1". Note that "0100" obtained by padding this prefix with "1" and "0"s corresponds to node "13", which is the lowermost node of ancestors common to leaf "1" and leaf "3" in the tree structure.

Note that steps S52 to S54 need not always be performed in the order named. For example, steps S53, S54, and S52 may be performed in the order named, or step S52 may be performed simultaneously with steps S53 and S54.

Subsequently, $\{(Mu-1)(Mu-2)/2+t-(L-Mu)+1\}$th secret key (represented by K) is acquired from the secret keys stored in the secret key storing unit 24 (step S55). In this case, in a decryption apparatus corresponding to leaf "1", a plurality of secret keys given to the decryption apparatus are stored in the secret key storing unit 24 in the order shown in FIG. 11. That is, secret keys are stored in the order of the first group in which parent node "9" of leaf "1" is u node, the second group in which parent node "13" of node "9" is u node, and the third group in which parent node "15" of node "13" is u node. A secret key which belongs to the first group and corresponds to a combination of node "9" serving as u node and child node "2" of node "9" serving as v node is stored first. A secret key which belongs to the second group and corresponds to a combination of node "13" serving as u node and child node "10" of node "13" serving as v node is stored second. Likewise, a secret key which corresponds to a combination of node "13" serving as u node and grandchild node "2" of node "13" serving as v node is stored third. A secret key which belongs to the third group and corresponds to a combination of node "15" serving as u node and child node "14" of node "15" serving as v node is stored fourth. Likewise, a secret key which corresponds to a combination of node "15" serving as u node and grandchild node "10" of node "15" serving as v node is stored fifth. Likewise, a secret key which corresponds to a combination of node "15" serving as u node and great-grandchild node "2" of node "15" serving as v node is stored sixth. In this manner, secret keys are stored in the order of increasing distance from leaf "1".

Expression (x5) given below allows to obtain at which ordinal position one of the above six secret keys is, from which a decryption key for decrypting a ciphertext corresponding to u node and v node contained in the index information of the ciphertext can be derived.

$$(Mu-1)(Mu-2)/2+t-(L-Mu)+1 \quad (x5)$$

The value of $\{(Mu-1)(Mu-2)/2\}$, which is the first half of expression (x5) given above, becomes "0" when u node is node "9"; "1" when u node is node "13", and "3" when u node is node "15", thus indicating which one of the first to third groups the secret key belongs.

The value of $\{t-(L-Mu)+1\}$, which is the second half of expression (x5) given above, indicates at which ordinal position the secret key is in each group.

In the case shown in FIG. 17, $\{(Mu-1)(Mu-2)/2\}=\{(4-1)(4-2)/2\}=3$ and $\{t-(L-Mu)+1\}=\{1-(4-4)+1\}=2$, and hence fifth secret key (the second secret key in the third group described above) k(15, 10) is acquired from the secret key storing unit 24 in which secret keys are stored in the order shown in FIG. 11. This secret key is represented by K.

In the above case, secret keys to be stored in the secret key storing unit 24 are stored in a predetermined order, and the ordinal position at which a secret key to be selected is calculated by using the index information of a ciphertext determined by the ciphertext determination unit 22 as a ciphertext which can be decrypted by the decryption apparatus and the ID of the decryption apparatus which is stored in the decryption apparatus ID storing unit 25. In secret key selection, no secret key index information is used. The present invention is not limited to this method. Coded data (U', V') may be acquired, and a secret key to which index information coinciding with acquired U' and V' is added may be searched out from the secret keys stored in the secret key storing unit 24.

Referring to FIG. 17, in step S54, "0110" (corresponding to node "10") is set as V' which is obtained by obtaining a prefix common to d and V, inverting a bit (the second bit in this of case), of the coded data "0001" of d, which differs for the first time upon comparison with V, starting from the most significant bit, and performing padding processing for the third and subsequent bits. U ("1000" corresponding to node "15" in this case) acquired in step S52 is set as U', and a secret key to which index information coinciding with obtained U' and V' is added is searched out from the secret keys stored in the secret key storing unit 24. In this secret key selection, when index information coinciding with obtained U and V is to be searched out, the index information of each secret key is used.

As described above, in secret key selection, a secret key from which a decryption key for decrypting ciphertext [i] can be derived is selected on the basis of a prefix common to the ID d of the decryption apparatus and coded data (V) representing v node contained in index information [i] of the ciphertext. Assume that there are pluralities of ciphertexts. In this case, d and each index information of each ciphertext is acquired. With regard to coded data V representing v node contained in the index information of each ciphertext, a search is then made for a ciphertext exhibiting the maximum value of a bit length t of the prefix common to d and V, and u node indicated by the index information of the found ciphertext is extracted (if v node has not been extracted, v node is also extracted). It is highly possible that a ciphertext corresponding to a larger value of the bit length t of a prefix common to d and V can be decrypted by the decryption apparatus. Therefore, the ciphertext determination unit 22 may determine, in descending order of the bit length t of the prefix common to d and V, whether ciphertexts can be decrypted by the decryption apparatus. With this operation, if a ciphertext corresponding to the maximum value of the bit length t of the prefix common to d and V can be decrypted, it can be expected that performing determination for one ciphertext makes it possible to complete a search for a ciphertext which can be decrypted by the decryption apparatus. Assume that a ciphertext corresponding to the maximum value of the bit length t of the prefix common to d and V cannot be decrypted. Even in this case, if a ciphertext corresponding to the second largest value of t can be decrypted, performing determination for only two ciphertexts makes it possible to complete a search for a ciphertext which can be decrypted by the decryption apparatus.

In this case, ciphertext determination processing may be performed by the ciphertext determination unit 22 in the following manner. The ID d of the decryption apparatus is acquired. In searching for a ciphertext corresponding to the maximum value of the bit length t of a prefix common to the ID d and V contained in the index information of each of a plurality of ciphertexts, the value of t is obtained by comparing d and V for each bit, and a search is made for V corresponding to the maximum value of t. Alternatively, d and each V may be converted into numerical values (converted from binary to decimal), and a search may be made for V representing a value nearest to the numerical value of d. It is then determined whether the leaf indicated by the ID d of the decryption apparatus is a leaf having u node as an ancestor but not having v node as an ancestor in the tree structure provided in advance. If YES is obtained in this decision step, it is determined that the ciphertext corresponding to the index information can be decrypted. If NO is obtained in the decision step, determination may be performed for a ciphertext corresponding to the second largest value of the bit length t of the prefix common to d and V, or the processing in FIG. 13 may be repeated.

Ciphertexts may be sorted in advance to perform a search for a ciphertext corresponding to the maximum value of the bit length t of the prefix common to d and V more efficiently. Ciphertexts may be sorted by either the transmitting system or the receiving system.

Figures 22, 23, 24:
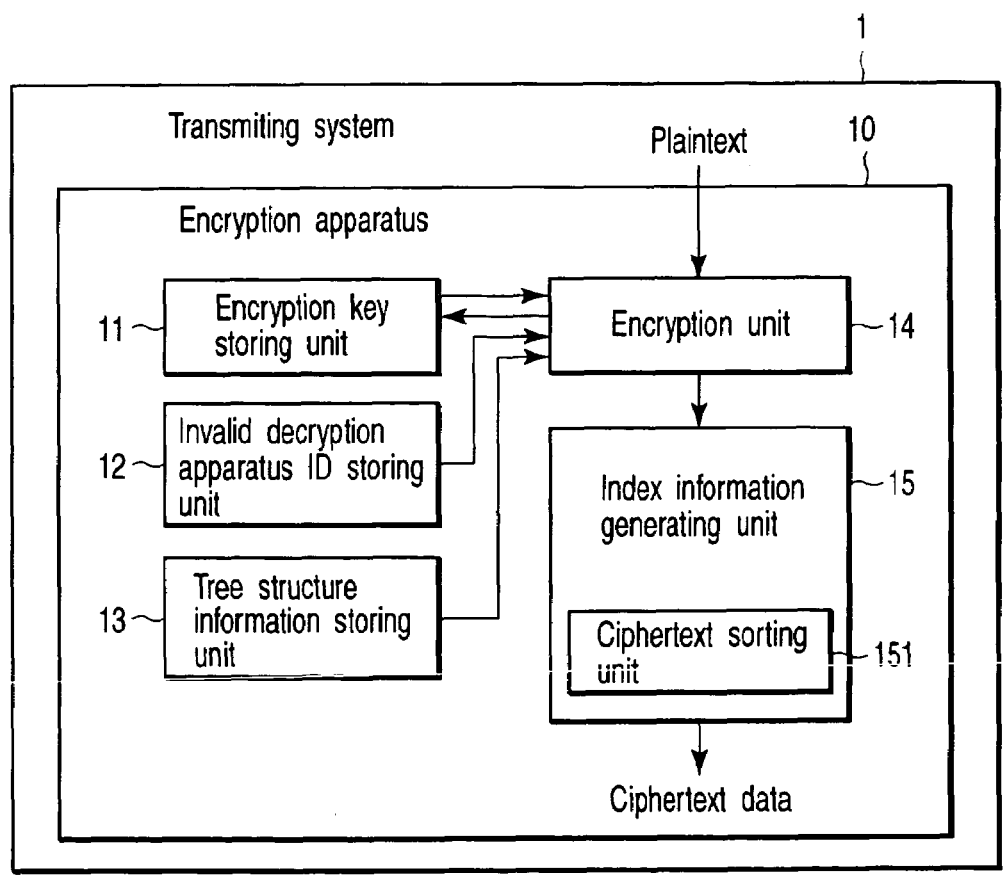
FIG. 22 is a view for explaining decryption key derivation processing, showing a decryption apparatus ID and codes representing u node and v node.
FIG. 23 is a view for explaining decryption key derivation processing.
FIG. 24 is a block diagram showing another example of the arrangement of a transmitting system.
Figure 25:
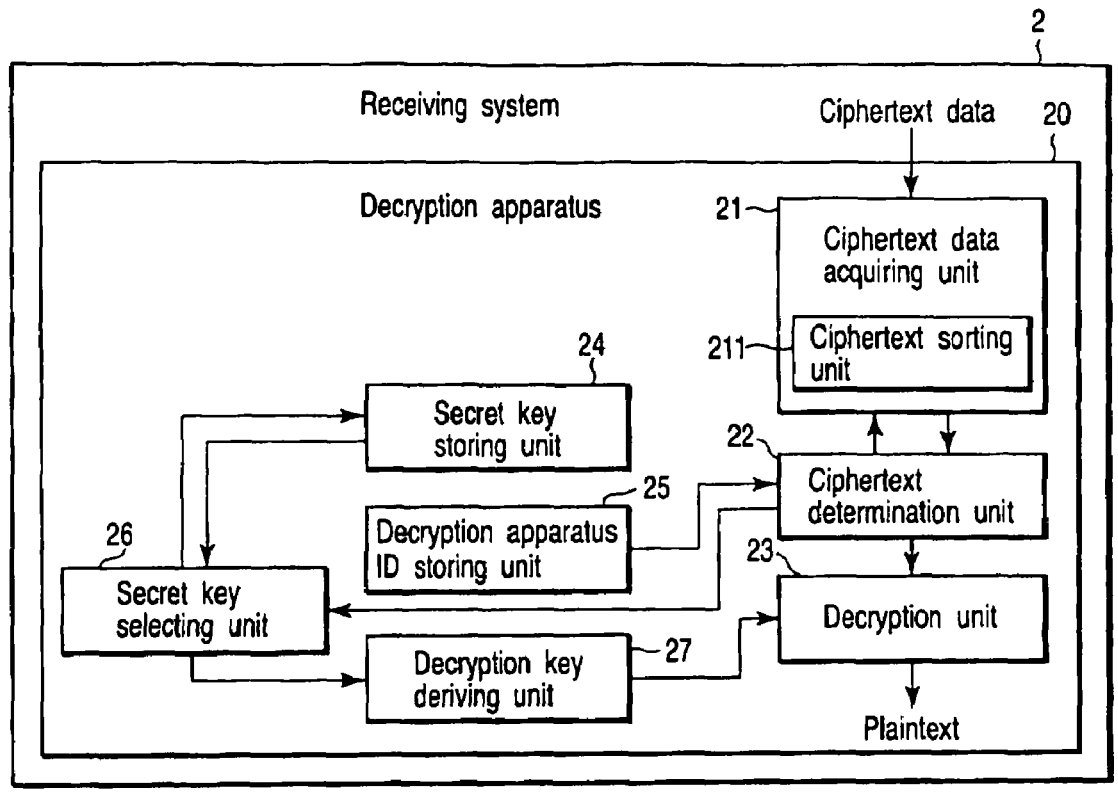
FIG. 25 is a block diagram showing another example of the arrangement of a receiving system.

FIG. 24 shows an example of the arrangement of the transmitting system when ciphertexts are sorted by the transmitting system. FIG. 25 shows an example of the arrangement of the receiving system when ciphertexts are sorted by the receiving system.

FIG. 24 shows a case wherein the index information generating unit 15 includes a ciphertext sorting unit 151, and ciphertexts are sorted in advance when index information for each ciphertext is to be generated. When the index information of each ciphertext is generated, the ciphertext sorting unit 151 sorts codes V representing v nodes contained in the pieces of index information of the respective ciphertexts in accordance with the positions of v nodes in the tree structure in the order from the root side to the downstream direction or from the leaf side to the upstream direction. The respective codes V converted into numerical values may be sorted in descending or ascending order. The ciphertexts and the pieces of index information of the ciphertexts are then sorted in the same order as the codes V representing v nodes contained in the pieces of index information of the respective ciphertexts are sorted. The index information generating unit 15 outputs the sorted ciphertexts and the sorted pieces of index information of the ciphertexts as ciphertext data.

Figure 26:
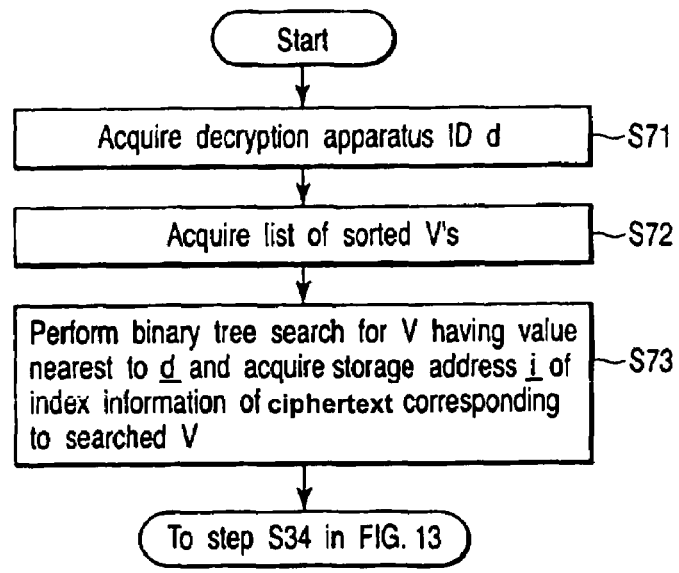
FIG. 26 is a flowchart for explaining ciphertext determination processing in a case wherein ciphertexts are sorted.

If the transmitting system has the arrangement shown in FIG. 24, the arrangement of the receiving system shown in FIG. 1 need not be changed. Ciphertext determination processing by the ciphertext determination unit 22 of the receiving system in this case will be described with reference to the flowchart of FIG. 26.

Upon receiving the sorted ciphertext data transmitted from the transmitting system, the ciphertext data acquiring unit 21 temporarily stores each ciphertext data. The ciphertext determination unit 22 acquires first the ID d of the decryption apparatus stored in the decryption apparatus ID storing unit 25 (step S71). The ciphertext data acquiring unit 21 then acquires a list of v nodes indicated by the pieces of index information of the respective ciphertexts (step S72). As described above, v nodes in this list have been sorted by the transmitting system. A search is then made for V corresponding to the maximum value of the bit length t of a prefix common to d and V. As a search method, a binary tree search may be performed for V corresponding to the maximum value of t upon obtaining the values of t by comparing d and each V for each bit. Alternatively, d and each V may be converted into numerical values (converted from binary to decimal), and a binary tree search may be performed for V representing a value nearest to the numerical value of d. A storage address i in the ciphertext data acquiring unit 21 is acquired, at which a ciphertext to which index information containing V corresponding to the maximum value of the bit length t of the prefix common to d and V is added is stored (step S73). Thereafter, the determination processing in step S34 in FIG. 13 is performed. In this determination processing, determination is performed by using the index information of the ith ciphertext acquired in step S73.

When the transmitting system has the arrangement shown in FIG. 1, the receiving system is designed such that the ciphertext data acquiring unit 21 includes a ciphertext sorting unit 211 as shown in FIG. 25. When the receiving system acquires ciphertext data, the ciphertext sorting unit 211 sorts ciphertexts. Ciphertext determination processing by the ciphertext determination unit 22 in this case will be described with reference to the flowchart of FIG. 26.

When the ciphertext data acquiring unit 21 receives the ciphertext data transmitted from the transmitting system, the ciphertext sorting unit 211 sorts codes V representing v nodes contained in the pieces of index information of the respective ciphertexts are sorted in accordance with the positions of v nodes in the tree structure in the order from the root side to the downstream direction or from the leaf side to the upstream direction. Alternatively, the respective codes V converted into numerical values may be sorted in descending or ascending order. The ciphertext data containing the ciphertexts and the pieces of index information of the ciphertexts are then sorted in the same order as the codes V representing v nodes contained in the pieces of index information of the respective ciphertexts are sorted, and the ciphertext data are temporarily stored in the ciphertext data acquiring unit 21.

The ciphertext determination unit 22 acquires first the ID d of the decryption apparatus stored in the decryption apparatus ID storing unit 25 (step S71). The ciphertext data acquiring unit 21 then acquires a list of v nodes indicated by the pieces of index information of the respective ciphertexts (step S72). As described above, v nodes in this list have been sorted by the ciphertext sorting unit 211. A search is then made for V corresponding to the maximum value of the bit length t of a prefix common to d and V. As a search method, a binary tree search may be performed for V corresponding to the maximum value of t upon obtaining the values of t by comparing d and each V for each bit. Alternatively, d and each V may be converted into numerical values (converted from binary to decimal), and a binary tree search may be performed for V representing a value nearest to the numerical value of d. A storage address i in the ciphertext data acquiring unit 21 is acquired, at which a ciphertext to which index information containing V corresponding to the maximum value of the bit length t of the prefix common to d and V is added is stored (step S73). Thereafter, the determination processing in step S34 in FIG. 13 is performed. In this determination processing, determination is performed by using the index information of the ith ciphertext acquired in step S73.

In the above case, a search is made for V corresponding to the maximum value of the bit length t of the prefix common to the ID d of the decryption apparatus and the code V representing v node contained in the index information of the ciphertext. However, the present invention is not limited to this, and a search may be made for V corresponding to the maximum value of the bit length t of the prefix common to the code V representing v node contained in the index information of the ciphertext and the code V' representing v node contained in the index information of the secret key.

For secret key selection, the following method may be used instead of the above method. A search is made for index information (of secret key) satisfying expressions (x3) and (x4) by using the index information of ciphertext determined by the ciphert ext determination unit 22 as a ciphertext which can be decrypted by the decryption apparatus having the ID d and the index information of secret key stored in the secret key storing unit 24, and a secret key corresponding to the index information is selected. In addition, as described above, when it is determined, by using the index information of secret key and the index information of ciphertext, in step S34' in FIG. 13A whether the ciphertext can be decrypted by the decryption apparatus having the ID d, it can be regarded in step S34' that ciphert ext determination and secret key selection are simultaneously performed.

Figure 19:
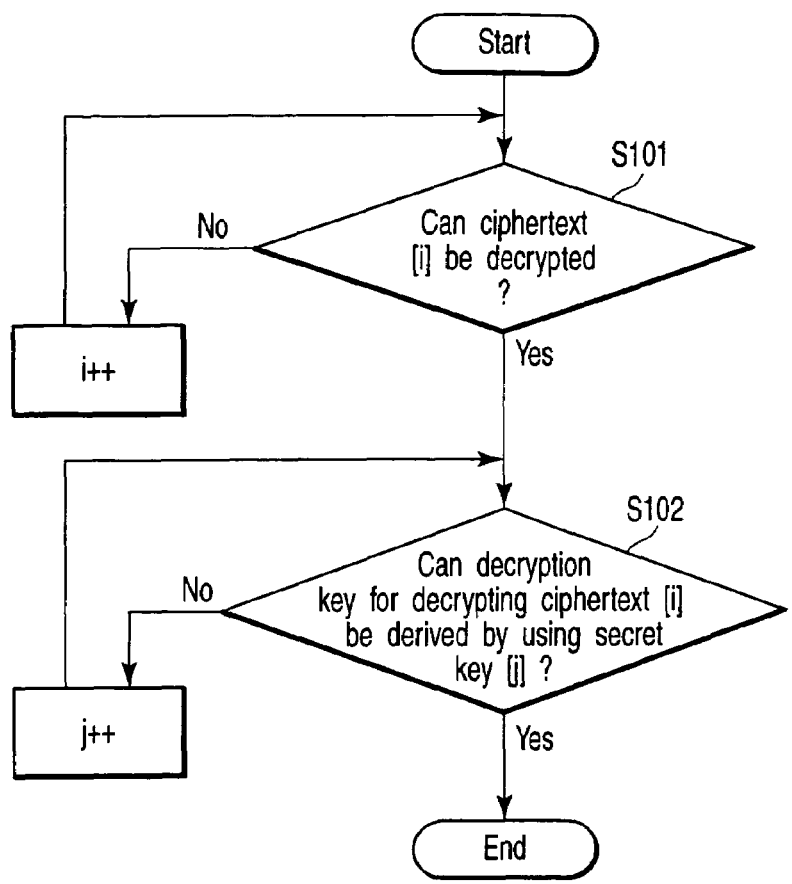
FIG. 19 is a flowchart for explaining an outline of processing operation in a conventional decryption apparatus.
Figure 20:
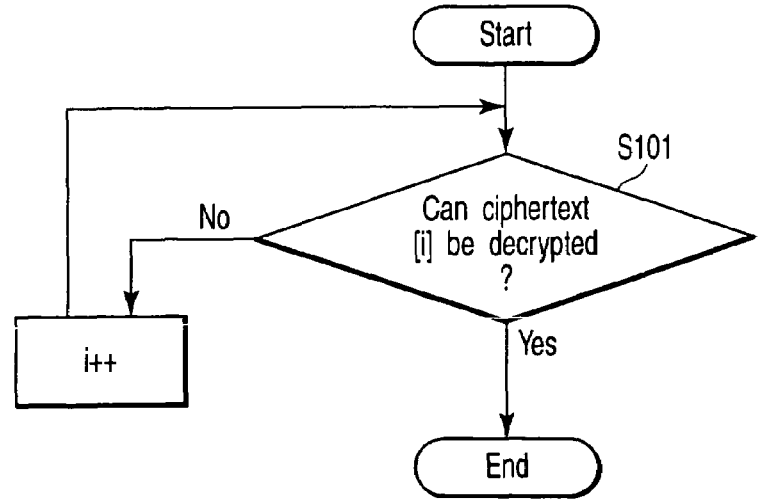
FIG. 20 is a flowchart for explaining an outline of processing operation in a decryption processing according to this embodiment.

The efficiency of secret key selection in this embodiment will be described with reference to FIGS. 19 and 20. As shown in FIG. 19, if secret keys are not stored in advance in a predetermined order (prior art), an exhaustive search must be performed in step S102 for a secret key from which a decryption key for decrypting the ciphertext determined as decryptable after the ciphertext determination processing in step S101 can be derived. In contrast to this, as shown in FIG. 20, in this embodiment, since secret keys are stored in advance in a predetermined order, it is only required to obtain a decryptable ciphertext by the ciphertext determination processing in step S101, and there is no need to perform secret key search processing for the selection of a secret key to be used for the derivation of a decryption key as in step S102 in FIG. 19 which indicates the prior art. In this embodiment, the ordinal position at which a secret key is stored is calculated by using the ID d of the decryption apparatus and codes representing u node and v node which are contained in the index information of the decryptable ciphertext obtained in step S35 in FIG. 13.

In ciphertext determination, according to the prior art, an exhaustive search must be performed for a ciphertext which can be decrypted by the decryption apparatus. In contrast to this, according to this embodiment, determination on whether a given ciphertext can be decrypted by the decryption apparatus is started from a ciphertext whose index information contains a code (V) representing v node whose bit length of a prefix common to the ID d of the decryption apparatus is the maximum value, i.e., determination is performed from a ciphertext whose possibility of being decryptable is higher, thereby saving unnecessary search and making the ciphertext determination processing efficient.

Figure 21:
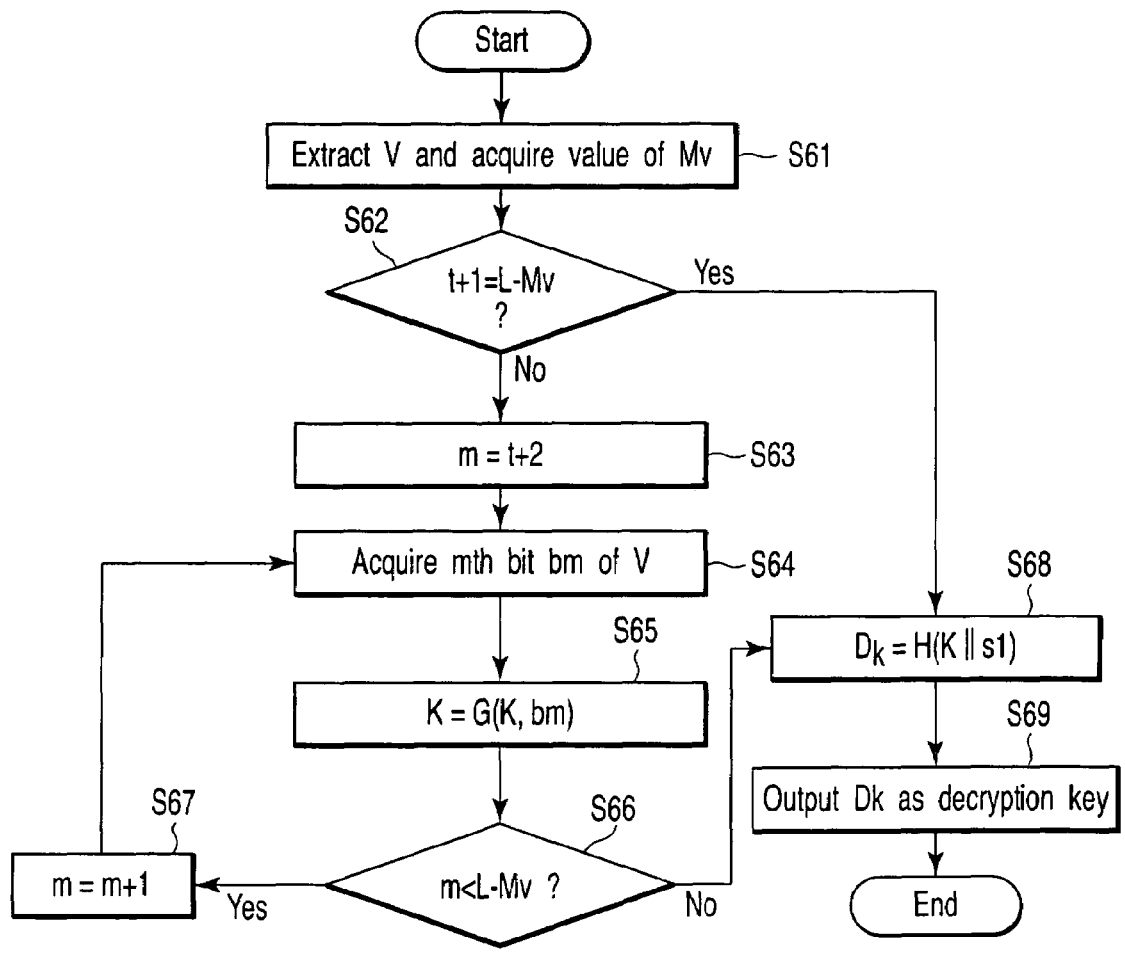
FIG. 21 is a flowchart for explaining decryption key derivation processing.

Decryption key derivation processing in the decryption key deriving unit 27 will be described next with reference to the flowchart of FIG. 21. First of all, coded data (V) representing v node contained in index information [i] of ciphertext [i] determined as decryptable in step S35 in FIG. 13 is extracted, and the value of the padding length Mv of V is acquired (step S61). Note that Mv can be acquired in determination processing in step S34 in FIG. 13 or in step S53 in FIG. 18 with reference to which secret key selection has been described. If Mv has already been acquired, step S61 may be omitted. In order to determine whether the position of v node corresponding to the secret key K acquired in step S55 in FIG. 18 coincides with the position of v node indicated by the code V contained in index information [i] of the ciphertext, it is determined whether t+1=L−Mv holds, by using the bit length t of the prefix common to the ID d of the decryption apparatus and the code V representing v node contained in the index information of the ciphertext (step S62). Note that t can also be acquired in step S54 in FIG. 18 or may be acquired by performing the same processing as that in step S54 in FIG. 18 again. If t+1=L−Mv does not hold, m=t+2 is set (step S63), and an mth (counted from the most significant bit) bit bm of V is acquired (step S64).

A case wherein u node indicated by the code U contained in index information [i] of a ciphertext is node "15", and v node indicated by the code V contained in index information [i] of the ciphertext is node "3" will be described with reference to FIG. 17. Note that the tree structure is shown in FIG. 15. If K is k(15, 10), since the position of v node of K (node "10") differs from the position of v node indicated by the code V contained in index information [i] of the ciphertext (node "3"), it is obvious that t+1≠L−Mv. The flow therefore advances to step S63. In this case, m=t+2=1+2=3, and "0" at the third bit counted from the most significant bit of V is acquired as bm (step S64). The value of K is updated by the following equation using the one-way function G with the acquired bit bm and secret key K being inputs (step S65). Note that this updating operation is performed on the working memory, and the secret key K stored in the secret key storing unit 24 is not itself updated.

$$G(K, bm) = H(K\| s0)(\text{if } bm = 0) \quad (x6)$$
$$= H(K\| s2)(\text{if } bm = 1)$$

In equation (x6) given above, the function G represents that if bm=0, a secret key with u node being u node corresponding to the secret key K and v node being a left child node of v node corresponding to the secret key K is output from the input secret key K by using a value s0, and that if bm=1, a secret key with u node being u node corresponding to the secret key K and v node being a right child node of v node corresponding to the secret key K is output from the input secret key K by using a value s2. In the above case, G(k(15, 10), 0) is calculated by using equation (x6) in step S65. This calculated value is secret key k(15, 3) with u node being node "15" and v node being node "3". The processing is proceeded by using the value obtained here as the secret key K.

The flow then advances to step S66 to determine whether the bit string up to the mth bit of V coincides with the bit string (bit count (L−Mv)) obtained by removing redundant bits from V, i.e., to determine whether the bit string up to the mth bit of V coincides with a code (without any redundant bits) representing the node (v node) indicated by the code V in the tree structure. If they do not coincide with each other, i.e., m is smaller than (L−Mv), the flow advances to step S67 to increment m by one. Steps S64 to S66 are then repeated. If it is determined in step S66 that the bit string up to the mth bit of V coincides with the code (without any redundant bits) representing the node (v node) indicated by the code V in the tree structure, i.e., m=L−mv, the flow advances to step S68.

In step S68, a decryption key Dk is derived according to equation (x7):

$$Dk=H(K\|s1) \quad (x7)$$

Equation (x7) given above expresses that from the secret key K obtained in step S65, the decryption key Dk with u node being u node corresponding to the secret key K and v node being v node corresponding to the secret key K is output.

If it is determined in step S62 that the position of v node corresponding to the secret key K acquired in step S55 in FIG. 18 coincides with the position of v node indicated by the code V contained in index information [i] of the ciphertext, i.e., t+1=L−Mv holds as well, the flow advances to step S68 to acquire the decryption key Dk by using equation (x7) given above.

A case will be described below, wherein the apparatus ID d is the code "0001" corresponding to leaf "1" in the tree structure shown in FIG. 15, and u node and v node contained in the index information of the ciphertext determined as decryptable in step S35 in FIG. 13 are node "13" and node "10" in FIG. 15, respectively. In this case, as shown in FIG. 22, d="0001", U="0100", and V="0110". As shown in FIG. 23, the bit length t of the prefix common to V and the apparatus ID d is 1, the padding length Mu of U is 3, and the padding length Mv of V is 2. In this case, in step S55 in FIG. 18, {(Mu−1)(Mu−2)/2+t−(L−Mu)+1}={(3−1)(3−2)/2+1−(4−3)+1}=second secret key, i.e., k(13, 10), is acquired from the secret keys stored in the order shown in FIG. 11. Since it is determined in step S62 that t+1=L−Mv holds and the position of v node corresponding to secret key k(13,10) coincides with the position of v node indicated by the code V contained in the index information of the ciphertext, the flow advances to step S68. In step s68, the value of H(k(13, 10)∥s1) is calculated and the calculated value is output as decryption key Dk(13, 10) (step S69).

In step S69, the decryption key Dk obtained in step S68 is output.

In the above case, a decryption key is derived from the code V indicating v node contained in the index information of the ciphertext determined as decryptable by the ciphertext determination unit 22, the secret key K selected by the secret key selecting unit 26, and the ID d of the decryption apparatus which is stored in the decryption apparatus ID storing unit 25, but the index information of the secret key selected by the secret key selecting unit 26 is not used. Therefore, the above case can be regarded as a case of deriving a decryption key for decrypting the ciphertext determined as decryptable by the ciphertext determination unit 22, by using the secret key selected by the secret key selecting unit 26, on the basis of the position of v node, in the tree structure, which is indicated by the index information of the ciphertext determined as decryptable by the ciphertext determination unit 22, and the position of the leaf, in the tree structure, which is indicated by the ID d of the decryption apparatus which is stored in the decryption apparatus ID storing unit 25.

A case will be described, wherein u node indicated by the code U contained in index information [i] of a ciphertext is node "15", and v node indicated by the code V contained in index information [i] of the ciphertext is node "3". Note that the tree structure is shown in FIG. 15. The value m obtained in step S63 is 3, L is 4, and Mv is 1. Therefore, m=L−Mv, and hence the flow advances from step S66 to step S68. In step S68, decryption key Dk(15, 3) is output from secret key k(15, 3) obtained in step S65 by using the value s1. This case is also a case of deriving a decryption key for decrypting the ciphertext determined as decryptable by the ciphertext determination unit 22, by using the secret key selected by the secret key selecting unit 26, on the basis of the position of v node, in the tree structure, which is indicated by the index information of the ciphertext determined as decryptable by the ciphertext determination unit 22 and the position of the leaf, in the tree structure, which is indicated by the ID d of the decryption apparatus which is stored in the decryption apparatus ID storing unit 25.

Figure 21A:
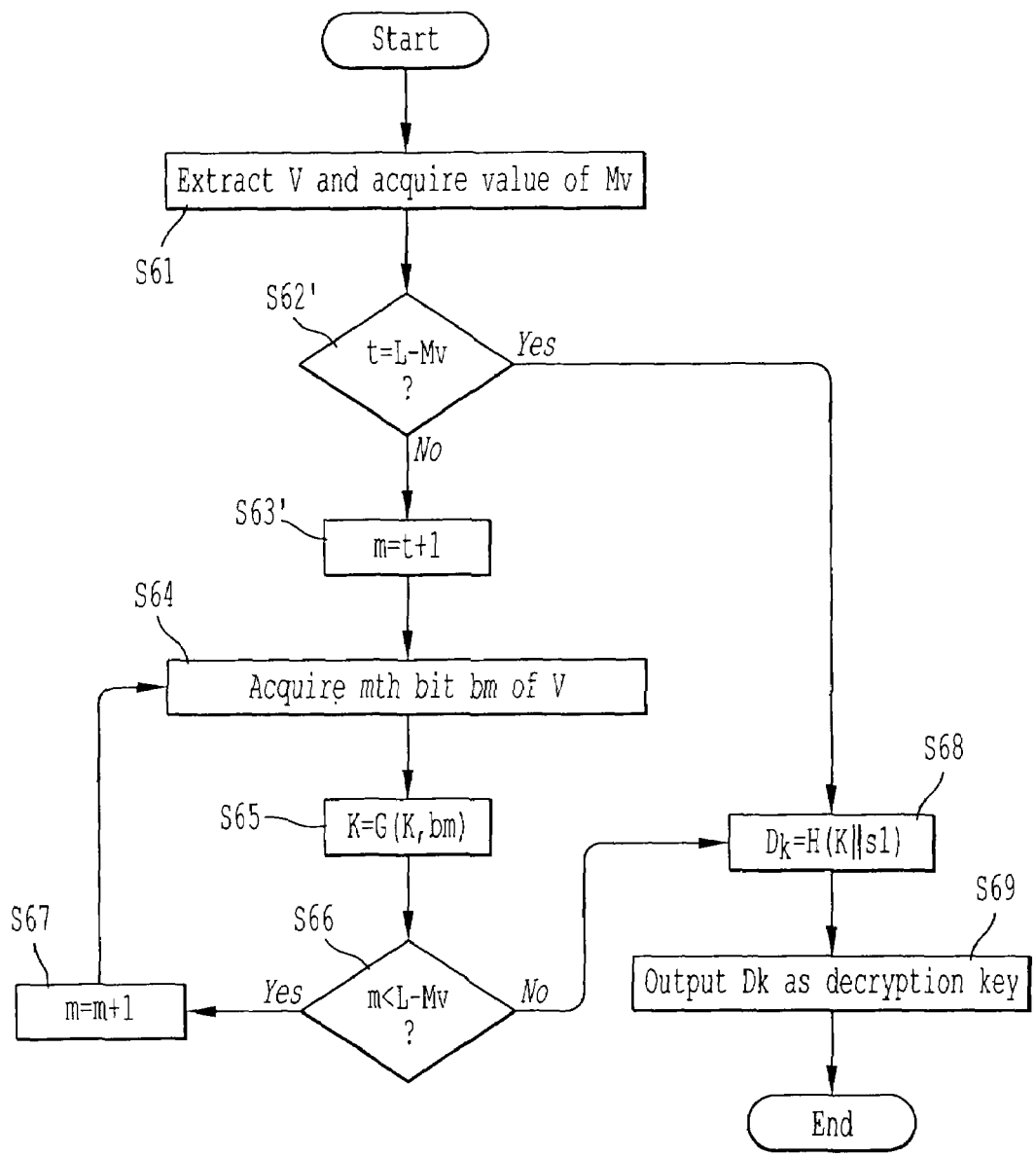
FIG. 21A is an alternate flowchart for explaining decryption key derivation processing.

The present invention is not limited to the above case. Illustrated in FIG. 21A, a decryption key may be derived from the code V indicating v node contained in the index information of the ciphertext determined as decryptable by the ciphertext determination unit 22, the secret key K selected by the secret key selecting unit 26, and the code V' indicating v node contained in the index information corresponding to the secret key selected by the secret key selecting unit 26. A case will be described, wherein u node and v node indicated by the codes U and V contained in the index information of the ciphertext determined as decryptable by the ciphertext determination unit 22 are node "15" and node "3", respectively, and u node and v node indicated by the codes U' and V' contained in the index information corresponding to the secret key selected by the secret key selecting unit 26 are node "15" and node "10", respectively. Note that the tree structure is shown in FIG. 15.

Since node "10" and node "3" are coded into "0110" and "0101", respectively, the bit length t of the prefix common to nodes "10" and "3" is 2. Upon decryption key derivation processing being performed by the decision expression in step S62' in FIG. 21A where t =L−Mv and by the assignment expression in step S63' where m =t +1, bm =0 is acquired in step S64, and secret key k(15, 3) is calculated in step S65. Finally, decryption key Dk(15, 3) is output in step 25 S69. This case can be regarded as a case of deriving a decryption key for decrypting the ciphertext determined as decryptable by the ciphertext determination unit 22, by using the secret key selected by the secret key selecting unit 26, on the basis of the position of v node, in the tree structure, which is indicated by the index information of the ciphertext determined as decryptable by the ciphertext determination unit 22 and the position of v node, in the tree structure, which is indicated by the index information corresponding to the secret key selected by the secret key selecting unit 26. by using the secret key selected by the secret key selecting unit 26, on the basis of the position of v node, in the tree structure, which is indicated by the index information of the ciphertext determined as decryptable by the ciphertext determination unit 22 and the position of v node, in the tree structure, which is indicated by the index information corresponding to the secret key selected by the secret key selecting unit 26.

According to the case described above, the secret key K selected by the secret key selecting unit 26 (or the secret key K selected by the secret key selecting unit 26 and index information corresponding to the secret key K) is notified from the secret key selecting unit 26 to the decryption key deriving unit 27 without any explicit acquisition request from the decryption key deriving unit 27. However, the present invention is not limited to this, and the secret key selecting unit 26 may notify the decryption key deriving unit 27 of the secret key K upon receiving an acquisition request from the decryption key deriving unit 27. In this case, in step S55 in FIG. 18, the secret key selecting unit 26 notifies the decryption key deriving unit 27 of the ordinal position at which the selected secret key K (or index information corresponding to the secret key K) is stored. When step S65 in FIG. 21 (step S68 if YES in step S62) is performed for the first time, the decryption key deriving unit 27 transmits the ordinal position at which the secret key K is stored in the secret key selecting unit 26 (or index information corresponding to the secret key K) to the secret key selecting unit 26, and issues a request for the secret key K. In accordance with the request from the decryption key deriving unit 27, the secret key selecting unit 26 notifies the decryption key deriving unit 27 of the secret key K (or the secret key K and index information corresponding to the secret key K). Note that in step S55 in FIG. 18, the secret key selecting unit 26 may notify the decryption key deriving unit 27 of both the ordinal position at which the selected secret key K is stored and index information corresponding to the secret key K.

When the decryption key deriving unit 27 is to transmit the ordinal position at which the secret key K is stored to the secret key selecting unit 26, the ordinal position at which the secret key K is stored is based on u node and v node indicated by the index information of the ciphertext determined as decryptable by the ciphertext determination unit 22. Therefore, the above case wherein a decryption key is derived from the code V indicating v node contained in the index information of the ciphertext determined as decryptable by the ciphertext determination unit 22, the secret key K selected by the secret key selecting unit 26, and the ID d of the decryption apparatus which is stored in the decryption apparatus ID storing unit 25 can be regarded as a case of deriving a decryption key for decrypting the ciphertext determined as decryptable by the ciphertext determination unit 22, by using the secret key selected by the secret key selecting unit 26, on the basis of the positions of u node and v node, in the tree structure, which are indicated by the index information of the ciphertext determined as decryptable by the ciphertext determination unit 22, and the position of the leaf, in the tree structure, which is indicated by the ID d of the decryption apparatus which is stored in the decryption apparatus ID storing unit 25.

When the decryption key deriving unit 27 is to transmit the ordinal position at which the secret key K is stored to the secret key selecting unit 26, the ordinal position at which the secret key K is stored is based on u node and v node indicated by the index information of the ciphertext determined as decryptable by the ciphertext determination unit 22. Therefore, the above case wherein a decryption key is derived from the code V indicating v node contained in the index information of the ciphertext determined as decryptable by the ciphertext determination unit 22, the secret key K selected by the secret key selecting unit 26, and the code V' indicating v node contained in the index information corresponding to the secret key selected by the secret key selecting unit 26 can be regarded as a case of deriving a decryption key for decrypting the ciphertext determined as decryptable by the ciphertext determination unit 22, by using the secret key selected by the secret key selecting unit 26, on the basis of the positions of u node and v node, in the tree structure, which are indicated by the index information of the ciphertext determined as decryptable by the ciphertext determination unit 22, and the position of v node, in the tree structure, which is indicated by the index information corresponding to the secret key selected by the secret key selecting unit 26.

When the decryption key deriving unit 27 is to transmit index information corresponding to the secret key K to the secret key selecting unit 26, the index information of the secret key K is based on u node and v node. Therefore, the above case wherein a decryption key is derived from the code V indicating v node contained in the index information of the ciphertext determined as decryptable by the ciphertext determination unit 22, the secret key K selected by the secret key selecting unit 26, and the code V' indicating v node contained in the index information corresponding to the secret key selected by the secret key selecting unit 26 can be regard as a case of deriving a decryption key for decrypting the ciphertext determined as decryptable by the ciphertext determination unit 22, by using the secret key selected by the secret key selecting unit 26, on the basis of the position of v node, in the tree structure, which is indicated by the index information of the ciphertext determined as decryptable by the ciphertext determination unit 22, and the positions of u node and v node in the tree structure, which are indicated by the index information corresponding to the secret key selected by the secret key selecting unit 26.

When the decryption key deriving unit 27 is to transmit both the ordinal position at which the secret key K is stored and index information corresponding to the secret key K to the secret key selecting unit 26, the ordinal position at which the secret key K is stored is based on u node and v node which are indicated by the index information of the ciphertext determined as decryptable by the ciphertext determination unit 22. Therefore, the above case wherein a decryption key is derived from the code V indicating v node contained in the index information of the ciphertext determined as decryptable by the ciphertext determination unit 22, the secret key K selected by the secret key selecting unit 26, the code V' indicating v node contained in the index information corresponding to the secret key selected by the secret key selecting unit 26 can be regarded as a case of deriving a decryption key for decrypting the ciphertext determined as decryptable by the ciphertext determination unit 22, by using the secret key selected by the secret key selecting unit 26, on the basis of the positions of u node and v node, in the tree structure, which are indicated by the index information of the ciphertext determined as decryptable by the ciphertext determination unit 22, and the positions of u node and v node in the tree structure, which are indicated by the index information corresponding to the secret key selected by the secret key selecting unit 26.

When ciphertext determination, secret key selection, or decryption key derivation is to be performed, the ID of the decryption apparatus which is stored in the decryption apparatus ID storing unit 25 may be used in place of the index information of the secret key stored in the secret key storing unit 24. In this case, since there is no need to store the index information of a secret key in the secret key storing unit 24, the amount of nonvolatile memory required for a decryption apparatus can be reduced.

The decryption unit 23 decrypts the ciphertext determined, by the ciphertext determination unit 22, as a ciphertext which can be decrypted by the decryption apparatus by using the decryption key derived by the decryption key deriving unit 27.

As described above, according to the above embodiment, one or a plurality of secret keys, each specified by two arbitrary nodes in a predetermined tree structure, and index information items each indicating the two nodes in the tree structure corresponding to each of the secret keys, are stored in the secret key storing unit 24. A decryption apparatus ID corresponding to one arbitrary leaf in the tree structure is stored in the decryption apparatus ID storing unit 25. The ciphertext data acquiring unit 21 acquires one or more ciphertexts and one ore more index information items each indicating two arbitrary nodes, in the tree structure, which correspond to a decryption key for each of the ciphertexts. When one of the two nodes indicated by the index information of the ciphertext acquired by the ciphertext data acquiring unit 21 is an ancestor node of the leaf indicated by the ID stored in the decryption apparatus ID storing unit 25 in the tree structure, and the other node is a node which is not an ancestor of the leaf, the ciphertext determination unit 22 determines that the ciphertext can be decrypted. The secret key selecting unit 26 then selects, from the secret keys stored in the secret key storing unit 24, a secret key from which a decryption key for decrypting the ciphertext determined as decryptable by the ciphertext determination unit 22 can be derived. The decryption key deriving unit 27 derives a decryption key for decrypting the ciphertext determined as decryptable by the ciphertext determination unit 22 by using the secret key selected by the secret key selecting unit 26. The ciphertext determined as decryptable by the ciphertext determination unit 22 is decrypted by using the decryption key derived by the decryption key deriving unit 27.

In the secret key storing unit 24, the secret keys each specified by two arbitrary nodes in the tree structure are stored in the order in which they are sorted on the basis of the positions of two nodes, in the tree structure, which correspond to each secret key (see FIGS. 9 and 11). In selecting a secret key, the secret key selecting unit 26 calculates the ordinal position at which the secret key from which a decryption key for decrypting the ciphertext which can be decrypted by the decryption apparatus can be derived is stored, on the basis of the positions of two nodes, in the tree structure, which are indicated by the index information of the ciphertext determined as decryptable, and the position of a leaf, in the tree structure, which is indicated by the decryption apparatus ID (see FIG. 18). This makes it possible to shorten the processing time required for key selection and hence to shorten the processing time required to acquire a plaintext after a received ciphertext is input to a decryption apparatus.

In addition, the ciphertext sorting unit 151 of the transmitting system or ciphertext sorting unit 211 of the receiving system sorts ciphertexts in advance on the basis of the index information of each ciphertext, and the above binary tree search is performed, thereby shortening the processing time for ciphertext determination. This therefore makes it possible to shorten the processing time required to acquire a plaintext after a received ciphertext is input to a decryption apparatus.

Assume that when ciphertext determination, secret key selection, or decryption key derivation is to be performed, the ID of the decryption apparatus which is stored in the decryption apparatus ID storing unit 25 is used in place of the index information of the secret key stored in the secret key storing unit 24. In this case, since there is no need to store the index information of a secret key in the secret key storing unit 24, the amount of nonvolatile memory required for a decryption apparatus can be reduced.

The techniques which are described in the embodiment above can be distributed as programs which can be executed by a computer upon being stored in a storage medium such as a magnetic disk (e.g., a flexible disk or hard disk), an optical disk (e.g., a CD-ROM or DVD), or a semiconductor memory. That is, the decryption apparatus 20 can be implemented by causing a computer to execute programs for making the computer function as the ciphertext data acquiring unit 21, ciphertext determination unit 22, decryption unit 23, secret key storing unit 24, decryption apparatus ID storing unit 25, secret key selecting unit 26, and decryption key deriving unit 27.

(1) According to embodiments described above, a description apparatus (a) stores a plurality of secret keys, each of which is specified by two nodes in a tree structure in first memory (a secret key storing unit); (b) stores an identifier of the decryption apparatus corresponding to a leaf in the tree structure in a second memory (a decryption apparatus ID storing unit); (c) acquires each ciphertext and each ciphertext index information item indicating two nodes, in the tree structure, which correspond to a decryption key for decrypting the each ciphertext, to obtain a plurality of ciphertexts and a plurality of ciphertext index information items corresponding to respective ciphertexts; (d) acquires a decryptable ciphertext from the ciphertexts, one of the two nodes indicated by the ciphertext index information item of the decryptable ciphertext being an ancestor node of the leaf corresponding the identifier and the other of the two nodes being a node which is not an ancestor node of the leaf; (e) selects, from the secret keys stored in the first memory, a secret key from which the decryption key is derived; (f) derives the decryption key, by using the secret key selected; and (g) decrypts the decryptable ciphertext by using the decryption key derived.

(2) The apparatus acquires the decryptable ciphertext from the ciphertexts in decreasing order of the number of ancestor nodes common to one of two nodes indicated by each of the ciphertext index information items of each of the ciphertexts and the leave corresponding to the identifier.

This makes it possible to greatly reduce the number of ciphertexts to be checked and reduce the processing time required for acquiring the decryptable ciphertext.

(3) The apparatus selects, from the secret keys stored in the first memory, the secret key from which the decryption key is derived, based on positions of two nodes, in the tree structure, which are indicated by the ciphertext index information item of the decryptable ciphertext and a position of the leaf in the tree structure.

This makes it unnecessary to perform an exhaustive search for a secret key from which the decryption key can be derived, and hence makes it possible to reduce the processing time required for secret key selection.

In addition, secret keys are stored in the first memory in accordance with an order based on positions of the two nodes, in the tree structure, which correspond to each of the secret keys, and the apparatus selects the secret key from which the decryption key is derived by calculating an ordinal position at which the secret key from which the decryption key is derived is stored, based on positions of two nodes, in the tree structure, which are indicated by the ciphertext index information item of the decryptable ciphertext and the position of the leaf in the tree structure.

This makes it possible to further reduce the processing time required for secret key selection.

According to the embodiment described above, the processing time required to acquire a plaintext after a ciphertext is input to a decryption apparatus can be reduced.

What is claimed is:

1. A decryption apparatus which decrypts a ciphertext, comprising:
   a decryption apparatus ID storing unit to store an identifier of the decryption apparatus corresponding to a leaf in a tree structure, the identifier indicating a path from a root of the tree structure to the leaf;
   a secret key storing unit to store a plurality of secret keys, each of which is specified by two nodes in the tree structure, one of the two nodes being an ancestor node of the leaf corresponding to the identifier and the other of the two nodes being a node which is not an ancestor node of the leaf;
   a first acquiring unit configured to acquire a plurality of ciphertexts, each ciphertext including a ciphertext index information item corresponding to a decryption key for decrypting the respective ciphertext, the ciphertext index information item including an u code and a v code corresponding to a u node and a v node in the tree structure, the u code and the v code indicating paths from the root to the u node and the v node;
   a second acquiring unit configured to acquire a decryptable ciphertext from the ciphertexts by using the u code and the v code included in each ciphertext index information item and the identifier, the u node of the decryptable ciphertext being an ancestor node of the leaf corresponding to the identifier and the v node of the decryptable ciphertext being a node which is not an ancestor node of the leaf;
   a selecting unit configured to select, from the secret keys stored in the secret key storing unit, a secret key from which the decryption key is derived by using the u code and the v code included in the ciphertext index information item of the decryptable ciphertext and the identifier;
   a deriving unit configured to derive the decryption key from the secret key selected, based on the v code included in the ciphertext index information item of the decryptable ciphertext and the identifier; and
a decryption unit configured to decrypt the decryptable ciphertext by using the decryption key derived.

2. An apparatus according to claim 1, wherein the second acquiring unit acquires the decryptable ciphertext by searching the ciphertexts in decreasing order of a bit length of prefix common to the v code included in each of the ciphertext index information items of the ciphertexts and the identifier.

3. An apparatus according to claim 1, wherein the secret key storing unit stores the secret keys in accordance with an order based on positions of the two nodes, in the tree structure, which correspond to each of the secret keys, and
the selecting unit selects the secret key from which the decryption key is derived by calculating an ordinal position at which the secret key from which the decryption key is derived is stored, based on the u code and the v code included in the ciphertext index information item of the decryptable ciphertext and the identifier.

4. An apparatus according to claim 1, wherein the secret key storing unit stores the secret keys and secret key index information items corresponding to respective secret keys, each secret key index information item including a first code and a second code corresponding to the two nodes, the first code and the second code indicating paths from the root to the two nodes.

5. A decryption apparatus which decrypts a ciphertext, comprising:
a decryption apparatus ID storing unit to store an identifier of the decryption apparatus which corresponds to a leaf in a tree structure, the identifier indicating a path from a root of the tree structure to the leaf;
a secret key storing unit to store a plurality of secret keys, each of which is specified by two nodes in the tree structure, and a plurality of secret key index information items corresponding to respective secret keys, each secret key index information item including a first code and a second code corresponding to the two nodes, the first code and the second code indicating paths from the root to the two nodes;
a first acquiring unit configured to acquire a plurality of ciphertexts, each ciphertext including a ciphertext index information item corresponding to a decryption key for decrypting the respective ciphertext, the ciphertext index information item including an u code and a v code corresponding to an u node and a v node in the tree structure, the u code and the v code indicating paths from the root to the u node and the v node;
a second acquiring unit configured to acquire a decryptable ciphertext from the ciphertexts by searching the ciphertexts in decreasing order of a bit length of prefix common to the v code included in each of the ciphertext index information items of respective ciphertexts and the identifier, the u node of the decryptable ciphertext being an ancestor node of the leaf corresponding to the identifier and the v node of the decryptable ciphertext being a node which is not an ancestor node of the leaf;
a selecting unit configured to select, from the secret keys stored in the secret key storing unit, a secret key from which the decryption key for decrypting the decryptable ciphertext is derived by using the u code and v code included in the ciphertext index information item of the decryptable ciphertext and the first code and the second code included in each of the secret key index information items stored in the secret key storing unit;
a deriving unit configured to derive the decryption key from the secret key selected, based on the v code included in the ciphertext index information item of the decryptable ciphertext and the second code included in the secret key index information item of the secret key selected by the selecting unit; and
a decryption unit configured to decrypt the decryptable ciphertext by using the decryption key derived.

6. An apparatus according to claim 5, wherein the secret key storing unit stores secret keys in accordance with an order based on positions of the two nodes, in the tree structure, which correspond to each of the secret keys.

7. A decryption apparatus which decrypts a ciphertext, comprising:
a decryption apparatus ID storing unit to store an identifier of the decryption apparatus which corresponds to a leaf in a tree structure, the identifier indicating a path from a root of the tree structure to the leaf;
a secret key storing unit to store a plurality of secret keys, each of which is specified by two nodes in the tree structure, and a plurality of secret key index information items corresponding to respective secret keys, each secret key index information item including a first code and a second code corresponding to the two nodes, the first code and the second code indicating paths from the root to the two nodes;
a first acquiring unit configured to acquire a plurality of ciphertexts, each ciphertext including a ciphertext index information item corresponding to a decryption key for decrypting the respective ciphertext, the ciphertext index information item including an u code and a v code corresponding to an u node and a v node in the tree structure, the u code and the v code indicating paths from the root to the u node and the v node;
a second acquiring unit configured to acquire a decryptable ciphertext from the ciphertexts by searching the ciphertexts in decreasing order of a bit length of prefix common to the v code included in each of the ciphertext index information items of respective ciphertexts and the identifier, the u node of the decryptable ciphertext being an ancestor node of the leaf corresponding to the identifier and the v node of the decryptable ciphertext being a node which is not an ancestor node of the leaf;
a selecting unit configured to select, from the secret keys stored in the secret key storing unit, a secret key from which the decryption key for decrypting the decryptable ciphertext is derived by using the u code and v code included in the ciphertext index information item of the decryptable ciphertext and the first code and the second code included in each of the secret key index information items stored in the secret key storing unit;
a deriving unit configured to derive the decryption key from the secret key selected, based on the v code included in the ciphertext index information item of the decryptable ciphertext and the identifier; and
a decryption unit configured to decrypt the decryptable ciphertext by using the decryption key derived.

8. An apparatus according to claim 7, wherein the secret key storing unit stores secret keys in accordance with an order based on positions of the two nodes, in the tree structure, which correspond to each of the secret keys.

9. A decryption apparatus which decrypts a ciphertext, comprising:
a decryption apparatus ID storing unit to store an identifier of the decryption apparatus which corresponds to a leaf in a tree structure, the identifier indicating a path from a root of the tree structure to the leaf;
a secret key storing unit to store a plurality of secret keys, each of which is specified by two nodes in the tree structure, and a plurality of secret key index information items corresponding to respective secret keys, each secret key index information item including a first code and a second code corresponding to the two nodes, the first code and the second code indicating paths from the root to the two nodes;

a first acquiring unit configured to acquire a plurality of ciphertexts, each ciphertext including a ciphertext index information item corresponding to a decryption key for decrypting the respective ciphertext, the ciphertext index information item including an u code and a v code corresponding to a u node and a v node in the tree structure, the u code and the v code indicating paths from the root to the u node and the v node;

a second acquiring unit configured to acquire a decryptable ciphertext from the ciphertexts by using the u code and the v code included in each ciphertext index information item and the identifier, the u node of the decryptable ciphertext being an ancestor node of the leaf corresponding to the identifier and the v node of the decryptable ciphertext being a node which is not an ancestor node of the leaf;

a selecting unit configured to select, from the secret keys stored in the secret key storing unit, a secret key from which the decryption key is derived by using the u code and the v code included in the ciphertext index information item of the decryptable ciphertext and the identifier;

a deriving unit configured to derive the decryption key from the secret key selected, based on the v code included in the ciphertext index information item of the decryptable ciphertext and the second code included in secret key index information item of the secret key selected by the selecting unit; and a decryption unit configured to decrypt the decryptable ciphertext by using the decryption key derived.

10. An apparatus according to claim 9, wherein the second acquiring unit acquires the decryptable ciphertext by searching the ciphertexts in decreasing order of a bit length of prefix common to the v code included in each of the ciphertext index information items of the ciphertexts and the identifier.

11. An apparatus according to claim 9, wherein the secret key storing unit stores the secret keys in accordance with an order based on positions of the two nodes, in the tree structure, which correspond to each of the secret keys, and the selecting unit selects the secret key from which the decryption key is derived by calculating an ordinal position at which the secret key from which the decryption key is derived is stored, based on the u code and the v code included in the ciphertext index information item of the decryptable ciphertext and the identifier.

12. A decryption method applied to a decryption apparatus comprising storing, in a decryption apparatus ID storing unit, an identifier of the decryption apparatus corresponding to a leaf in a tree structure the identifier indicating a path from a root of the tree structure to the leaf;

storing, in a secret key storing unit, a plurality of secret keys, each of which is specified by two nodes in the tree structure, one of the two nodes being an ancestor node of the leaf corresponding to the identifier and the other of the two nodes being a node which is not an ancestor node of the leaf;

acquiring a plurality of ciphertexts, each ciphertext including a ciphertext index information item corresponding to a decryption key for decrypting the respective ciphertext, the ciphertext index information item including an u code and a v code corresponding to an u node and a v node in the tree structure, the u code and the v code indicating a path from the root to the u node and the v node;

acquiring a decryptable ciphertext from the ciphertexts by using the u code and the v code included in each ciphertext index information item and the identifier, the u node of the decryptable ciphertext being an ancestor node of the leaf corresponding to the identifier and v node of the decryptable ciphertext being a node which is not an ancestor node of the leaf;

selecting, from the secret keys stored in the secret key storing unit, a secret key from which the decryption key is derived by using the u code and the v code included in the ciphertext index information item of the decryptable ciphertext and the identifier;

deriving the decryption key from the secret key selected, based on the v code included in the ciphertext index information item of the decryptable ciphertext and the identifier; and decrypting the decryptable ciphertext by using the decryption key derived.

13. A method according to claim 12, wherein acquiring the decryptable ciphertext acquires the decryptable ciphertext by searching the ciphertexts in decreasing order of a bit length of prefix common to the v code included in each of the ciphertext index information items of the ciphertexts and the identifier 14. A method according to claim 12, which includes sorting secret keys in accordance with an order based on positions of the two nodes, in the tree structure, which correspond to the respective secret keys, to store the secret keys sorted in the secret key storing unit; and wherein selecting selects the secret key from which the decryption key is derived by calculating an ordinal position at which the secret key from which the decryption key is derived is stored, based on the u code and the v code included in the ciphertext index information item of the decryptable ciphertext and the identifier.

15. A method according to claim 12, wherein the secret key storing unit stores the secret keys and secret key index information items corresponding to respective secret keys, each secret key index information item including a first code and a second code corresponding to the two nodes, the first code and the second code indicating paths from the root to the two nodes.

16. A computer readable storage medium storing a computer program to be executed by a computer, the computer including a first memory which stores an identifier corresponding to the computer and corresponding to a leaf in a tree structure, the identifier indicating a path from a root of the tree structure to the leaf, and a second memory which stores a plurality of secret keys, each of which is specified by two nodes in the tree structure, one of the two nodes being an ancestor node of the leaf corresponding to the identifier and the other of the two nodes being a node which is not an ancestor node of the leaf, the computer when executing the computer program stored on the computer readable storage medium performs the steps comprising:

instructing a computer processor to acquire a plurality of ciphertexts, each ciphertext including a ciphertext index information item corresponding to a decryption key for decrypting the respective ciphertext, the ciphertext index information item including an u code and a v code corresponding to an u node and a v node in the tree structure, the u code and the v code indicating paths from the root to the u node and the v node;

for instructing the computer processor to acquire a decryptable ciphertext from the ciphertexts by using the u code and the v code included in each ciphertext index information item and the identifier, the u node of the decryptable ciphertext being an ancestor node of the leaf corresponding to the identifier and the v node of the decryptable ciphertext being a node which is not an ancestor node of the leaf;

for instructing the computer processor to select, from the secret keys stored in the second memory, a secret key from which the decryption key is derived by using the u code and the v code included in the ciphertext index information item of the decryptable ciphertext and the identifier;

for instructing the computer processor to derive the decryption key from the secret key selected based on the v code included in the ciphertext index information item of the decryptable ciphertext and the identifier; and for instructing the computer processor to decrypt the decryptable ciphertext by using the decryption key derived.

* * * * *